United States Patent [19]

Itakura et al.

[11] Patent Number: 6,157,946
[45] Date of Patent: Dec. 5, 2000

[54] COMMUNICATION SYSTEM CAPABLE OF PROVIDING USER WITH PICTURE MEETING CHARACTERISTICS OF USER AND TERMINAL EQUIPMENT AND INFORMATION PROVIDING DEVICE USED FOR THE SAME

[75] Inventors: Yuichiro Itakura; Yuichiro Tsutsui, both of Tokyo; Nobuyuki Fujita, Kanagawa, all of Japan

[73] Assignee: NetZero Inc., Westlake Village, Calif.

[21] Appl. No.: 09/125,833

[22] PCT Filed: Feb. 26, 1997

[86] PCT No.: PCT/JP97/00563

§ 371 Date: Aug. 26, 1998

§ 102(e) Date: Aug. 26, 1998

[87] PCT Pub. No.: WO97/32257

PCT Pub. Date: Sep. 4, 1997

[30] Foreign Application Priority Data

Feb. 28, 1996 [JP] Japan ................................ 8-067278
May 10, 1996 [JP] Japan ................................ 8-139689

[51] Int. Cl.[7] ............................................... G60F 15/16
[52] U.S. Cl. ................................... 709/217; 709/219
[58] Field of Search ............................ 709/217, 219, 709/227, 232; 705/14; 345/333, 335

[56] References Cited

U.S. PATENT DOCUMENTS 5,347,632  9/1994  Filepp et al. ........................... 709/202
5,572,643  11/1996 Judson ................................... 709/218
5,740,549  4/1998  Reilly et al. ............................. 705/14
5,754,774  5/1998  Bittinger et al. ...................... 709/203
5,761,662  6/1998  Dasan .................................... 707/10
5,794,210  8/1998  Goldhaber et al. ..................... 705/14
5,812,784  9/1998  Watson et al. ......................... 709/227
5,913,040  6/1999  Rakavy et al. ......................... 709/232
5,946,646  8/1999  Schena et al. ......................... 702/177
5,959,623  9/1999  van Hoff et al. ...................... 345/333

Primary Examiner—Zarni Maung
Assistant Examiner—Bradley Edelman
Attorney, Agent, or Firm—Steven C. Sereboff; Arter & Hadden LLP

[57] ABSTRACT

An information provider and a searcher provide messages appropriate to a particular user of a terminal regardless of the sites of the World Wide Web the user accesses. The information provider establishes a physical communication line to the terminal. A first logical link is established on the physical communication line for forwarding a first image from the World Wide Web to the terminal. User identification is received from the terminal, and forwarded to a searcher storing user information and the transmittal conditions of a second message, through a second communication line. An second image appropriate for the particular user is searched for by a searcher from a message database based on the user information and the transmittal conditions, and transmitted to the terminal through a second logical link also established on the first communication line.

28 Claims, 30 Drawing Sheets

FIG.4

MESSAGE USER DATABASE 34

| MESSAGE USER ID | MESSAGE USER PASSWORD | PROVIDER ID | PROVIDER USER ID | DISPLAYED TIME | DATE OF BIRTH | SEX | MARRIED | OCCUPATION | ADDRESS | NAME |
|---|---|---|---|---|---|---|---|---|---|---|
| XXX | YYY | A | ZZZ | 1:00:15 | 1968.6.2 | MALE | NO | CORPORATION | SHINJYUKU-KU TOKYO | TARO YAMADA |
| AAA | BBB | B | CCC | 0:15:34 | 1967.1.7 | FEMALE | YES | FREE | ICHIKAWA CHIBA | ICHIRO TANAKA |
| ⋯ | ⋯ | ⋯ | ⋯ | ⋯ | ⋯ | ⋯ | ⋯ | ⋯ | ⋯ | ⋯ |

FIG.5

TRANSMITTAL CONDITION DATABASE 36

| MESSAGE URL | INDIVIDUAL LIMIT TYPE | INDIVIDUAL LIMIT | TOTAL LIMIT TYPE | TOTAL LIMIT | DISPLAYED TIME | AGE | SEX | MARRIED | OCCUPATION | ADDRESS |
|---|---|---|---|---|---|---|---|---|---|---|
| --- | DAY | 3 | DAY | 1000 | --- | 18-22 | MALE | NO | CORPORATION | TOKYO |
| --- | TOTAL | 10 | MONTH | 10000 | --- | --- | FEMALE | YES | STUDENT | KANAGAWA |
| --- | --- | --- | --- | --- | 1996.1.1 /12:00 | --- | --- | --- | --- | --- |

PROVIDER USER DB 25

| PROVIDER USER ID | PROVIDER USER PASSWORD | CHARGE TIME | CHARGE |
|---|---|---|---|
| XXX | YYY | 1:20:20 | ¥120 |
| ......... | ......... | ......... | ......... |

*FIG.12*

CONNECTION LOG 38

| PROVIDER ID | PROVIDER USER ID | EVENT | DATE | TIME |
|---|---|---|---|---|
| A | XXX | LOGON | 1996.1.31 | 0:15:00 |
| A | XXX | CHARGE HALT | 1996.1.31 | 0:15:01 |
| B | AAA | LOGON | 1996.1.31 | 1:21:15 |
| A | XXX | CHARGE START | 1996.1.31 | 2:09:05 |
| A | XXX | CHARGE HALT | 1996.1.31 | 2:15:08 |
| B | BBB | | | |
| A | CCC | | | |
| ...... | ...... | ...... | ...... | ...... |

*FIG.15*

COMMUNICATION SYSTEM CAPABLE OF PROVIDING USER WITH PICTURE MEETING CHARACTERISTICS OF USER AND TERMINAL EQUIPMENT AND INFORMATION PROVIDING DEVICE USED FOR THE SAME

This application is the national phase of international application PCT/JP97/00563, filed Feb. 26, 1997 which designated the U.S.

RELATED APPLICATIONS

U.S. application Ser. No. 09/188,571 entitled, "Message Searching System and Terminal."

U.S. application Ser. No. 09/206,385 entitled "Terminal Information Providing Device, System and Recording Medium."

U.S. application Ser. No. 09/117,331 entitled, "Information Display System."

U.S. application Ser. No. 09/125,894 entitled "Communication System for Distributing Such Message as Advertisement to User of Terminal Equipment."

U.S. application Ser. No. 09/276,708 entitled, "Terminal Which Stores Information on Communication Network in Local Memory Automatically."

FIELD OF THE INVENTION

This invention relates to an information provider, a searcher and a computer terminal, for providing information obtained from a communications network, such as Internet (the World Wide Web, WWW). The present invention is related to the following Japanese patent applications, the contents of which are incorporated herein by reference.

Japanese application 8-9521 filed on Jan. 23, 1996.
Japanese application 8-67278 filed on Feb. 28, 1996.
Japanese application 8-139689 filed on May 10, 1996.
Japanese application 8-139690 filed on May 10, 1996.
Japanese application 8-163679 filed on Jun. 5, 1996.

BACKGROUND OF THE INVENTION

When accessing a communications network such as the World Wide Web (WWW) or a personal computer communications network which is based on a BBS function, the terminal (e.g., personal computer) of a user is connected via a modem and a telephone line to a first host computer, which is referred to as an information provider. Users can access the information provider, and other host computers further connected to the communications network, through the information provider. Users can receive information from both the information provider and other host computers connected to Internet (the World Wide Web) or personal computer network.

The information provider and the other host computers connected to the information provider identify each user based on a user ID and a password in order to be able to charge for their services while providing information. The information supplied to the user is displayed within a single window on the display. Users can scroll the displayed information within the window and jump to sub pages. The information provider on Internet may provide designated information selected by the user together with additional information such as advertisements. In this case, the additional information is displayed within the same window as the designated information.

However, when the user scrolls the designated information on the terminal, the additional information may disappear. This prevents the additional information such as advertisements from being efficiently provided to the user. Furthermore, identical information can oftentimes be accessed through any of multiple information providers, which can also be accessed by the same terminal software. A typical example of such identical information is a home page provided on Internet. When accessing such information, a user can not tell which information provider he is using.

SUMMARY OF THE INVENTION

Therefore, it is an object of the present invention to provide a communications system, a host computer and a computer terminal which are capable of providing the additional information such as advertisements to the user, regardless of the user's operation. It is another object of the present invention to provide a communications system, a host computer and a computer terminal such that users can tell which host computer they are connected to.

According to the first aspect of the present invention, a terminal connects to the World Wide Web through an information provider for receiving a first image provided on the World Wide Web and a second image provided by the information provider. The terminal establishes a PPP communication line to the information provider and activates a browser for displaying the first image. The terminal establishes a first TCP/IP link on the communication line to receive the first image and displays the first image within a browser window. The terminal further activates a viewer for displaying the second image, establishes a second TCP/IP link on the communication line to receive the second image, and displays the second image within a viewer window.

According to the second aspect of the present invention, the viewer displays a button, reads the linking information from the second image when the button is selected, and supplies the linking information to the browser so as to display the first image designated by the linking information within the browser window. The viewer further supplies the information provider with information indicating that the first image has been accessed.

According to the third aspect of the present invention, a terminal connects through a communications network to an information provider having a plurality of images. The terminal requests the information provider to select a first image from the plurality of images and to transmit the first image, receives the first image and displays the first image within a window. The terminal further requests the information provider to select and transmit a second image, receives the second image while the first image is displayed, and switches the first image to the second image. Because the second image is received while the first image is displayed, the terminal is able to switch the images quickly.

According to the fourth aspect of the present invention, the terminal transmits terminal user information to the information provider and requests the information provider to search for the second image using information which includes that not used for searching for the first image. Because of the simple search conditions for the first image, it can be searched quickly. Here, a counter may be provided for measuring a period of time during which a given image is displayed within the window so that a second image may be displayed when the counter reaches a predetermined value, without any adverse influence on the network system from data traffic.

The terminal may reset the value of the counter when the window or the image in the window is operated on, so as to keep the image displayed for a longer time when the user is interested in the image. The second image can still be displayed quickly because it is held in a buffer even when the window or the image is operated on.

According to the fifth aspect of the present invention, the terminal connects to an information provider to receive an image and displays the image. The terminal also displays a button for requesting information related to the image displayed, and requests the name and address of the terminal user from the information provider when the button is selected. The terminal receives and displays the name and address, inputs a confirmation of the name and address, and requests the information related to the displayed image to be sent to the name and address, when the confirmation is input.

According to the sixth aspect of the present invention, the terminal can connect to host computers through one of a plurality of information providers. The terminal receives a first image, which identifies the information provider through which the terminal is communicating with the host computer, and a second image selected by the host computer, and displays both the first and second images. Therefore, a user can tell which information provider he is using to communicate with a host computer.

In this case, the terminal receives an image identification (image ID) which identifies the first image to be received from the information provider through which the terminal communicates with the host computer and receives the first image from the information provider only when the terminal does not already have the first image. The terminal displays the first image read from the terminal when the terminal has identified the first image by the image identification. Therefore, data traffic between the information provider and the terminal is decreased and the first image can be displayed on the terminal quickly.

According to the seventh aspect of the present invention, the terminal transmits the image identification of the first image stored in the terminal to the information provider, and displays the first image stored in the terminal. Therefore, data traffic between the information provider and the terminal is decreased and the first image is displayed on the terminal quickly. Here, the information providers may have a plurality of identification images for identifying the information provider. The image identification may include first information for identifying the information provider with which the terminal is communicating and second information for identifying one identification image from those stored in the information provider.

According to the eighth aspect of the present invention, a communication line is connected between a terminal and an information provider connected to Internet. A first logical link is established on the communication line to forward a first image from Internet to the terminal. A second logical link is also established on the communication line to transmit a second image from the information provider to the terminal periodically. Since the two logical links are independent, the second image can be periodically changed and displayed on the terminal regardless of Internet home page being accessed by the terminal user.

According to the ninth aspect of the present invention, the information provider receives a user ID, which identifies the terminal user. The information provider connects a second communication line to a searcher storing user information about the user and message transmission conditions, and forwards the user ID to the searcher. The information provider reads out a message from a message database based on a message ID identifying the message searched for by the searcher, and transmits the message to the terminal. Therefore, regardless of Internet home page being accessed by the user, the second image (message) is searched for based on the user information and displayed on the terminal.

The information provider may transmit a image based on a message request sent from the terminal via a second logical link, so that the terminal can change the timing for displaying the next image.

According to the tenth aspect of the present invention, a message manager may notify a connection manager in the information manager of the status of the terminal display.

The information manager may stop charging the terminal when the whole message is displayed on the terminal and start charging the terminal when the whole of the message is not displayed on the terminal. Users are thus encouraged to keep the whole message displayed on the terminal. As an alternative, the information manager may stop charging the terminal when the whole message was displayed on the terminal for a predetermined period of time and may start charging the terminal when the whole of the message was not displayed on the terminal for the predetermined period of time.

According to the eleventh aspect of the present invention, the information provider may stop charging the terminal when the notification of the terminal display status indicates that the message viewer which displays the message on the terminal is active, and start charging the terminal when the notification indicates that the message viewer is not active. Therefore, when the message can not be periodically displayed because, for example, the message viewer is frozen, the information provider can start charging the terminal.

According to the twelfth aspect of the present invention, a searcher searches for a second image and sends the second image to the terminal which also receives a first image through the information provider from a communications network, such as Internet. The searcher has a message user database for storing user information about the terminal user, and a transmittal condition database for storing transmittal conditions of the messages. The searcher receives a message user ID for identifying the user of the message through a communication line when the user starts connecting to the communications network, and retrieves the user information from the message user database based on the message user ID. The searcher retrieves a message from the transmittal condition database based on the user information and transmits a message ID identifying the retrieved message to the terminal through the communication line.

According to the thirteenth aspect of the present invention, the message user database has a provider user ID for identifying a user from those of the information provider. The searcher further retrieves the provider user ID based on the message user ID, and transmits the provider user ID to the information provider when it starts transmitting the message.

According to the fourteenth aspect of the present invention, the searcher receives link identification information identifying the link used for receiving the message user ID. The searcher stores the provider user ID in the connection log in association with the link identification information and receives the notification of the display status of the message on the terminal. The searcher retrieves the provider user ID from the connection log based on the port number of the link which was used to receive the notification on the communication line, and transmits a command based on the notification to the information provider with the provider user ID.

In the fifteenth aspect of the present invention, the searcher instructs the information provider via the command to stop charging the terminal when the notification indicates that the entire message is displayed on the terminal, and instructs the information provider via the command to start charging the terminal when the notification indicates that the entire message is not displayed on the terminal. Therefore, users are encouraged to keep the whole message displayed.

According to the sixteenth aspect of the present invention, the searcher instructs the information provider via the command to stop charging the terminal when the notification indicates that the message viewer which displays the message on the terminal is active, and instructs the information provider via the command to start charging the terminal when the notification indicates that the message viewer is not active.

According to the seventeenth aspect of the present invention, the searcher instructs the information provider via the command to stop charging the terminal when whole message was displayed on the terminal for a predetermined period of time, and instructs the information provider via the command to start charging the terminal when the whole message was not displayed on the terminal for the predetermined period of time.

According to the eighteenth aspect of the present invention, the searcher periodically transmits a confirmation request specified by the link identification information recorded in the connection log to the terminal to confirm whether the terminal is in communication with the searcher.

The communication line may be a dedicated line. In this case, the searcher communicates with the plurality of information providers through the dedicated line. According to the nineteenth aspect of the present invention, the provider user ID is used as a message user ID. This simplifies the connection sequence.

BRIEF DESCRIPTION OF THE DRAWINGS

FIG. 4 illustrates the message user database 34.

FIG. 5 illustrates the transmittal condition database 36.

FIG. 12 is the provider user database 25.

FIG. 15 illustrates the structure of the connection log 38.

PREFERRED EMBODIMENTS OF THE INVENTION

The preferred embodiments will be described with reference to the attached drawings, in the order of with the following index.

Index

Figure 1:
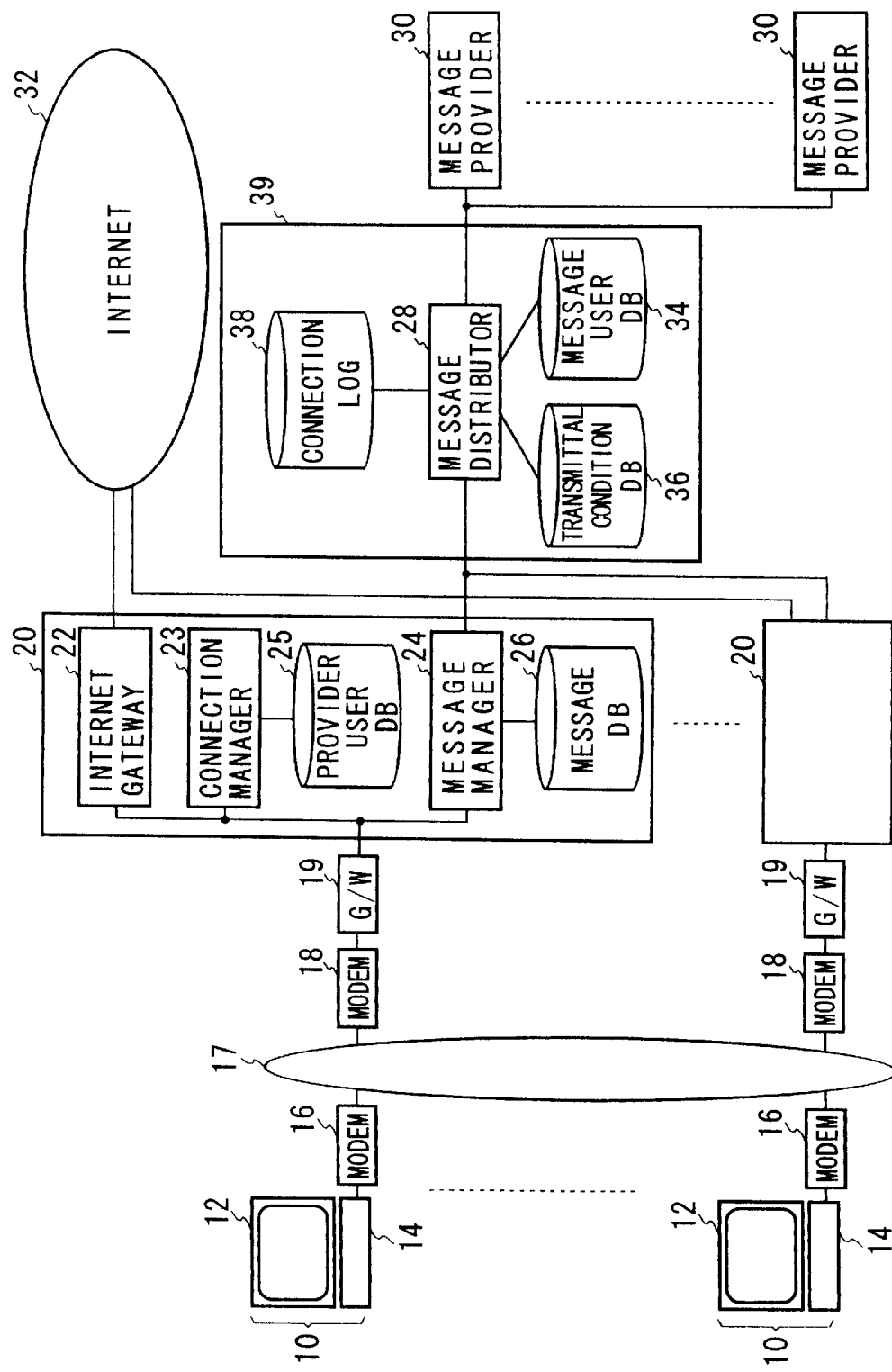
FIG. 1 is a block diagram of an information providing system according to an embodiment of the invention.

1. First Embodiment
1.1 Hardware Construction
1.1.1 Communications System
1.1.2 Terminal 10
1.1.3 Connection Manager 23, Message Manager 24 and Message Distributor 28
1.2 Data and Software Construction
1.2.1 Message User Database 34
1.2.2 Message Transmittal Condition Database 36
1.2.3 Software for Terminal 14
1.2.4 Display
1.3 Operations for Beginning Communication
1.3.1 Connection Sequence
1.3.2 Operation of Terminal 10 in the Connection Sequence
1.3.2.1 Establishing Connection
1.3.2.2 Changing Logo
1.3.2.3 Displaying Initial Message
1.3.3 Operation of Connection Manager 23 in the Connection Sequence
1.3.4 Operation of Message Manager 24 in the Connection Sequence
1.3.5 Operation of Message Distributor 28 in the Connection Sequence
1.4 Operations after Communication Begins
1.4.1 Connection Log
1.4.2 Confirming Message Viewer 1.4.3 Halting and Resuming Communication
1.4.4 Charging Process in Connection Manager 23
1.4.5 Message Request Process in Terminal 10
1.4.6 Message Access Process in Terminal 10
1.4.7 Charge Process in Message Distributor 28
1.4.8 Message Searching Process in Message Distributor 28
2. Second Embodiment
2.1 Hardware Construction
2.2 Operation
3. Third Embodiment
4. Other Embodiments
4.1 Timing to Begin Charging
4.2 Function of Browser 74
4.3 Database Construction
4.4 User Identification
4.5 Recording Medium Construction
4.6 Appearance on Display 12
4.7 Network System Construction
5. Some Alternatives 1. First Embodiment
1.1 Hardware Construction
1.1.1 Communications System FIG. 1 is a block diagram showing an example of the information display system of the invention. A plurality of terminals 10 is connected to each of the information providers 20 via the modems 16 and 18, a public network 17 (communications network), and a public network gateway 19. Each information provider 20 is managed by a so-called Internet provider.

One or more message providers 30 are connected to the message distribution system 39 by a dedicated line. A message provider 30 supplies to the message distribution system 39 additional information such as advertisements (also referred to as messages), transmittal conditions for the respective messages, and Internet home page address of the respective message providers. Messages may include still images, dynamic images, voice sounds, or any combinations of these.

The message distribution system 39 has a message distributor 28 (searcher), a message user database 34, a transmittal condition database 36, and a connection log 38. The message distribution system 39 distributes messages received from the message providers 30 and home page addresses of the message providers to the information provider 20. The message distribution system 39 further stores the transmittal conditions of each message, received from the message provider 30, in the message transmittal condition database 36 in association with identification information for the message. The message user database 34 stores data about the message user of each terminal.

The message distributor 28 is connected to the information providers 20 by dedicated lines. The message distributor 28 transmits the messages supplied from the message providers 30 to each of the information providers 20 of the respective message providers. Each message contains data indicating the home page address of the message provider. The message manager 24 in the information provider 20 receives the message from the message distribution system 39, and stores the message in the message database 26 in association with the message ID (URL).

The terminal 10 can receive information, such as a home page, from Internet 32 through Internet gateway 22 of the information provider 20. The terminal 10 also receives messages from the message manager 24. The message manager 24 reads out a message from the message database 26 and transmits the message to the terminal 10 based on a request from the terminal 10. The user of the terminal 10 is assigned a provider user ID and provider user password that are used to connect through the public network gateway 19 to Internet gateway 22. The user is also assigned a message user ID and message user password which are used to obtain messages from the message manager 24.

If a plurality of information providers 20 is connected to the public network 17, users can connect to any one of the information providers 20 to communicate with Internet 32 and the message distributor 28. The user needs the respective provider IDs of all the information providers 20 to which the user wants to connect. However, a single message user ID can be used regardless of the information provider 20 to which the user connects.

1.1.2 Hardware of Terminal 10

Figure 2:
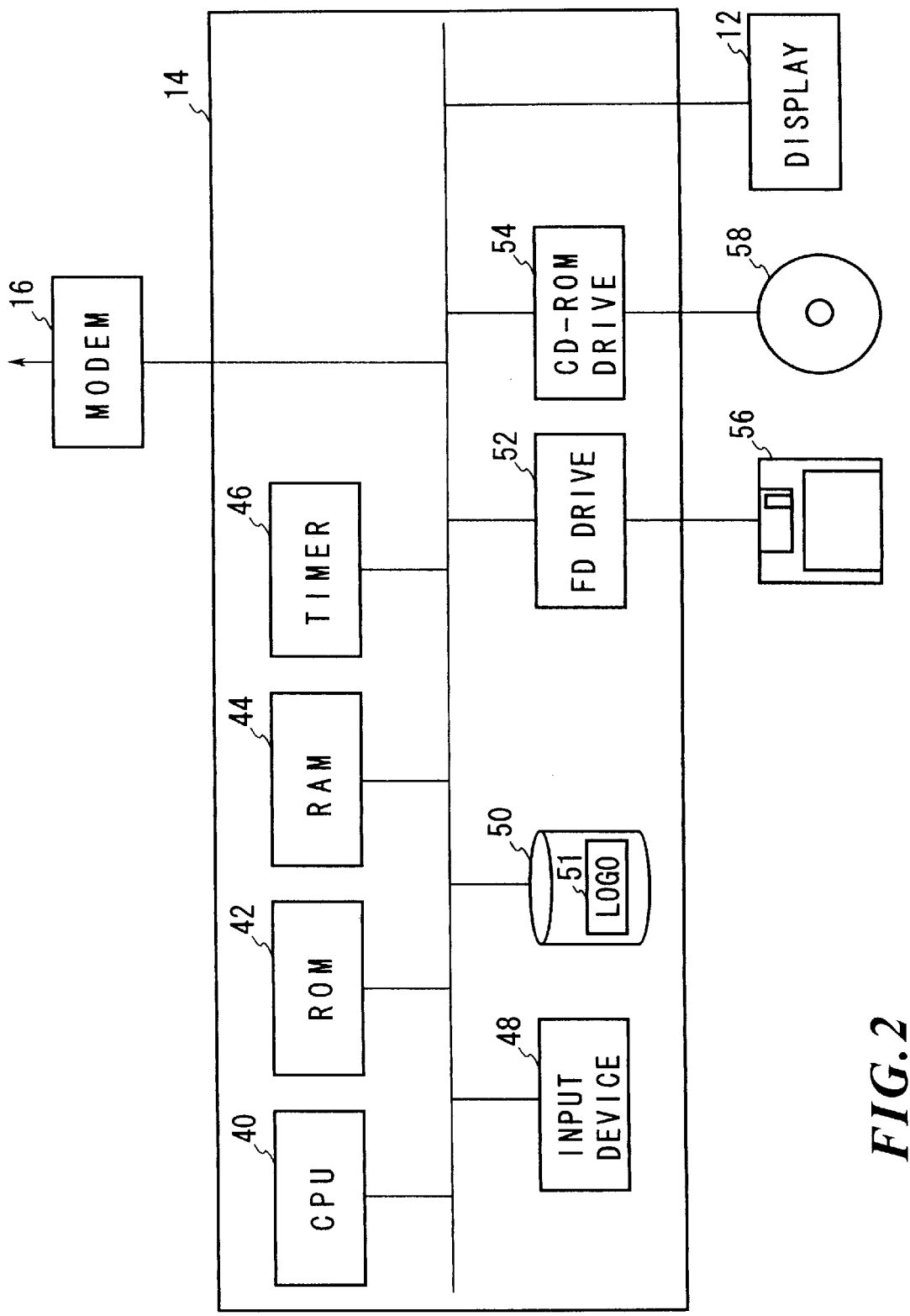
FIG. 2 is a block diagram of the terminal 10.

FIG. 2 is a hardware block diagram of the main body 14 of the terminal 10. The CPU 40 operates based on programs stored in ROM 42 and RAM 44. A timer 46 measures time in order to provide notification of when a predetermined period of time has elapsed. The user conducts operations, such as accessing messages, through the input device 48. The hard disk drive 50 stores data such as the logo image 51 of the information provider 20 (identification image for identifying the information provider 20) and other images, and programs. The floppy disk drive 52 reads out data or a program from the floppy disk 56 to provide it to the CPU 40. The CD-ROM drive 54 reads out data or a program from the CD-ROM 58 to provide it to the CPU 40. The main body 14 has a modem interface which is used to connect to the modem 16, and a display interface which is used to connect to the display 12.

1.1.3 Hardware of Connection Manager 23, Message Manager 24 and Message Distributor 28

Figure 3:
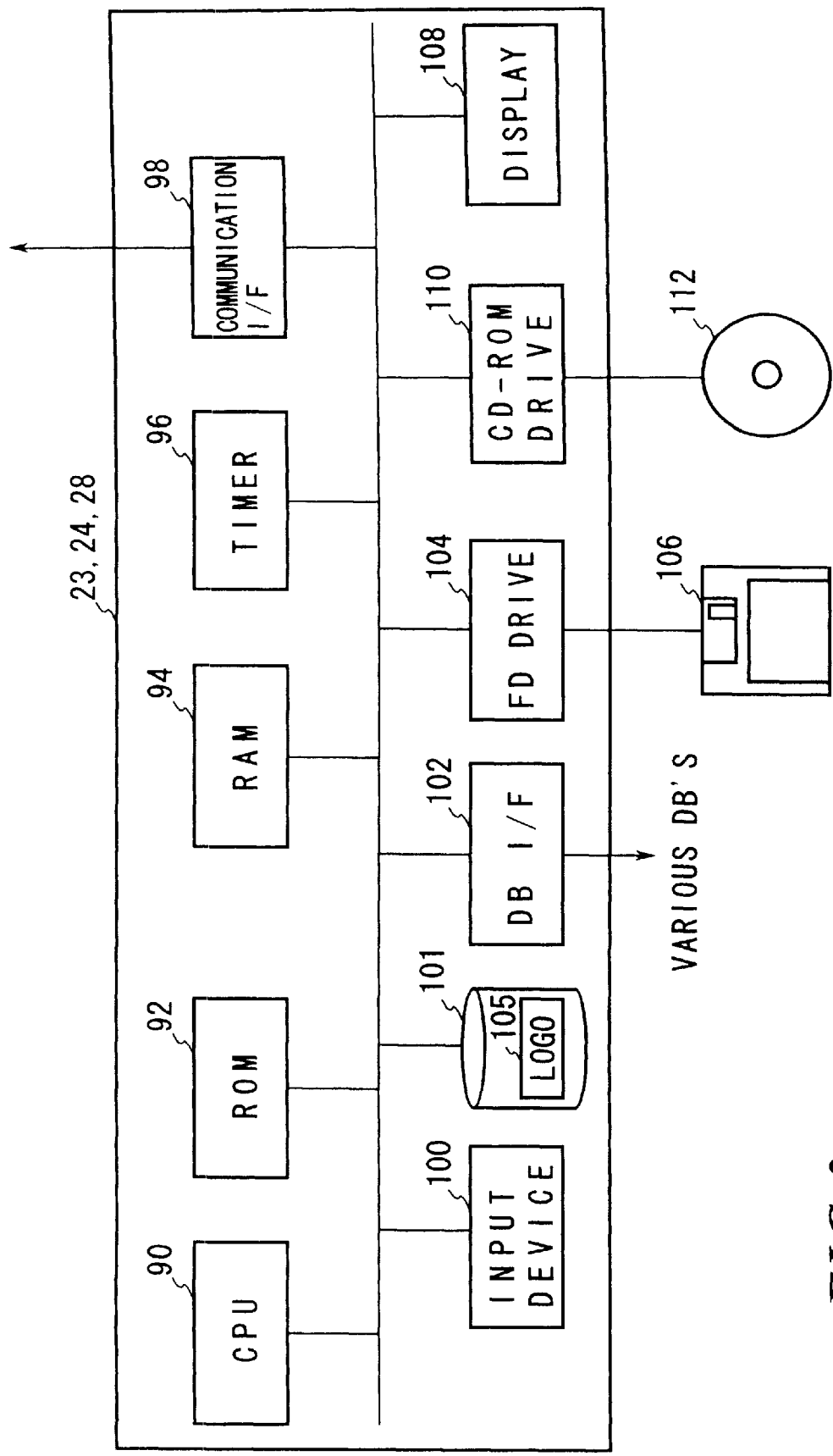
FIG. 3 is a block diagram of the connection manager 23 and the message distributor 28.

FIG. 3 is a block diagram showing the hardware of the connection manager 23, the message manager 24 and the message distributor 28. The CPU 90 operates based on programs stored in ROM 92 and RAM 94. The timer 96 counts out a predetermined period of time. The communication interface 98 processes inputs and outputs to and from the communication line. The message distributor 28 may includes two communication interfaces 98 and 98' for connecting to the message provider 30 and the information provider 20, respectively.

The user inputs data through the input device 100. The hard disk drive 101 stores data such as the logo image of the information provider 20 and other images, and programs. The database interface 102 connects the system to various databases constructed by, for example, a hard disk drive. The floppy disk drive 104 reads out data or a program from the floppy disk 106 and provides it to the CPU 90. The display 108 displays the communication status, etc., to the operator. A CD-ROM drive 110 reads data and programs from the CD-ROM 112 to provide them to the CPU 90.

1.2 Data and Software Construction
1.2.1 Message User Database 34

FIG. 4 illustrates the message user database 34. The message user database 34 contains user information, such as message user ID, message user password, provider ID for identifying each provider, provider user ID, display time, date of birth, sex, marital status, occupation, address, user's name, etc. The user must input user information to the terminal 10 when using a message viewer for receiving information from, for example, the message manager 24 for the first time, or when installing the message viewer program into the terminal 10.

The terminal 10 transfers the inputted user information to the information provider 20, which further transfers this user information to the message distributor 28. The message distributor 28 stores the user information supplied by the information provider 20 in the message user database 34. The user information may also include the user's age, occupational category, income, hobbies, the types of message in which the user is interested, the hardware characteristics of terminal 10 of the user (for example, hard disk drive capacity, memory capacity, modem speed, and display resolution), etc.

1.2.2 Message Transmittal Condition Database 36

FIG. 5 shows the transmittal condition database 36. The transmittal condition database 36 stores message URLs for identifying each message in association with its transmittal conditions. The message transmittal conditions may include display frequency limitation for each user, display frequency limitation for all the users, display time, user's age range, sex, marital status, occupation, address, etc. The message distributor 28 retrieves a message URL based on the user information and transmits the retrieved message URL to the terminal 10 in response to a request from the terminal 10. Thus, the URL of the appropriate message, which matches the user's request, can be sent to the terminal 10.

A plurality of messages having different numbers of pixels may be provided for the different terminal displays having different numbers of pixels. In this case, the ideal number of pixels of the terminal display is included in the message transmittal conditions in the message transmittal condition database 36 and the number of pixels of each user's terminal is stored in the message user database 34 as user information. Types or categories of messages can also be stored in the message transmittal condition database 36 in association with the message URLs, while types or categories of messages in which the user is interested are stored in the user database as user information. When storing the hardware characteristics of the user's terminal 10 in the message user database 34, the terminal characteristics of the terminals whose users are to receive a given (type of) message are stored in the message transmission database 26 in association with the message URLs. In this case, for example, a message related to memory, for example, an advertisement for memory, can be provided to a terminal having less than 16M bytes of memory.

1.2.3 Software Construction of Main Body 14

Figure 6:
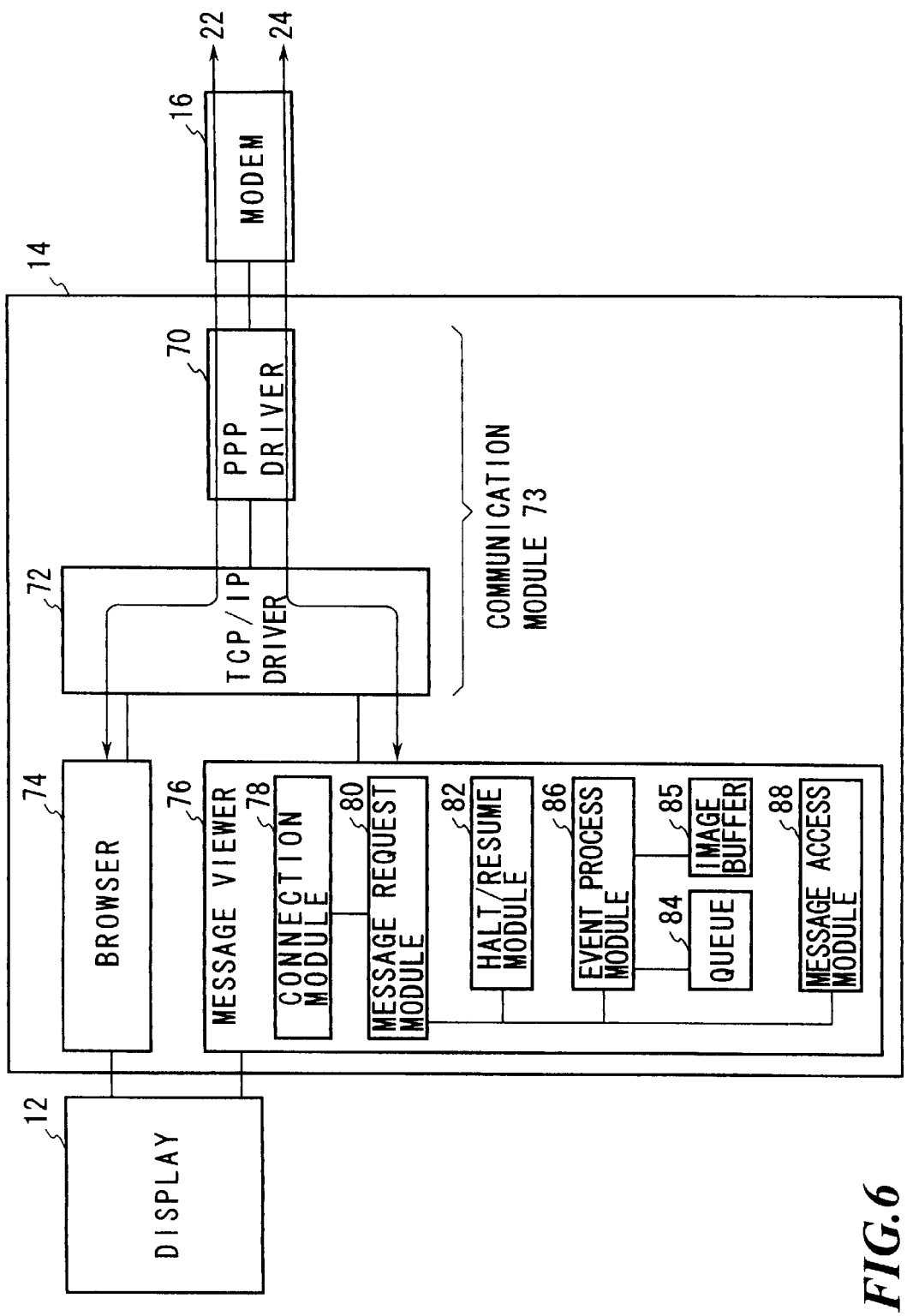
FIG. 6 is a functional block diagram of the software to be executed by the CPU 40 of the main body 14.

FIG. 6 is a block diagram showing the functional construction of the software executed by the CPU 40 of the main body 14. The software is stored in a recording medium, such as a CD-ROM 58 or a floppy disk 56, to be supplied to users. The software stored in the recording medium may be either compressed or uncompressed. The software stored in the recording medium is installed into the hard disk drive 50 and read out to the RAM 44 for execution. The software, which is provided by the recording medium (and is installed into the hard disk drive 50), comprises a communication module 73, a browser 74 and a message viewer 76. The communication module further has a PPP driver 70 and a TCP/IP driver 72.

The PPP driver 70 establishes a data link to the information provider 20. The browser 74 communicates with Internet gateway 22 through the data link created by the PPP driver 70. The message viewer 76 communicates with the message manager 24 via the data link created by the PPP driver 70. The message viewer 76 has a connection module 78, a message request module 80, a halt/resume module 82, an event process module 86 and a message access module 88. The event process module 86 manages a queue 84 for storing the URL received from the message distributor 28, and an image buffer 85 for storing the messages received from the information provider. The queue 84 is created in the RAM 44 and the image buffer 85 is created in the RAM 44 or the hard disk drive 50.

1.2.4 Display

Figure 7:
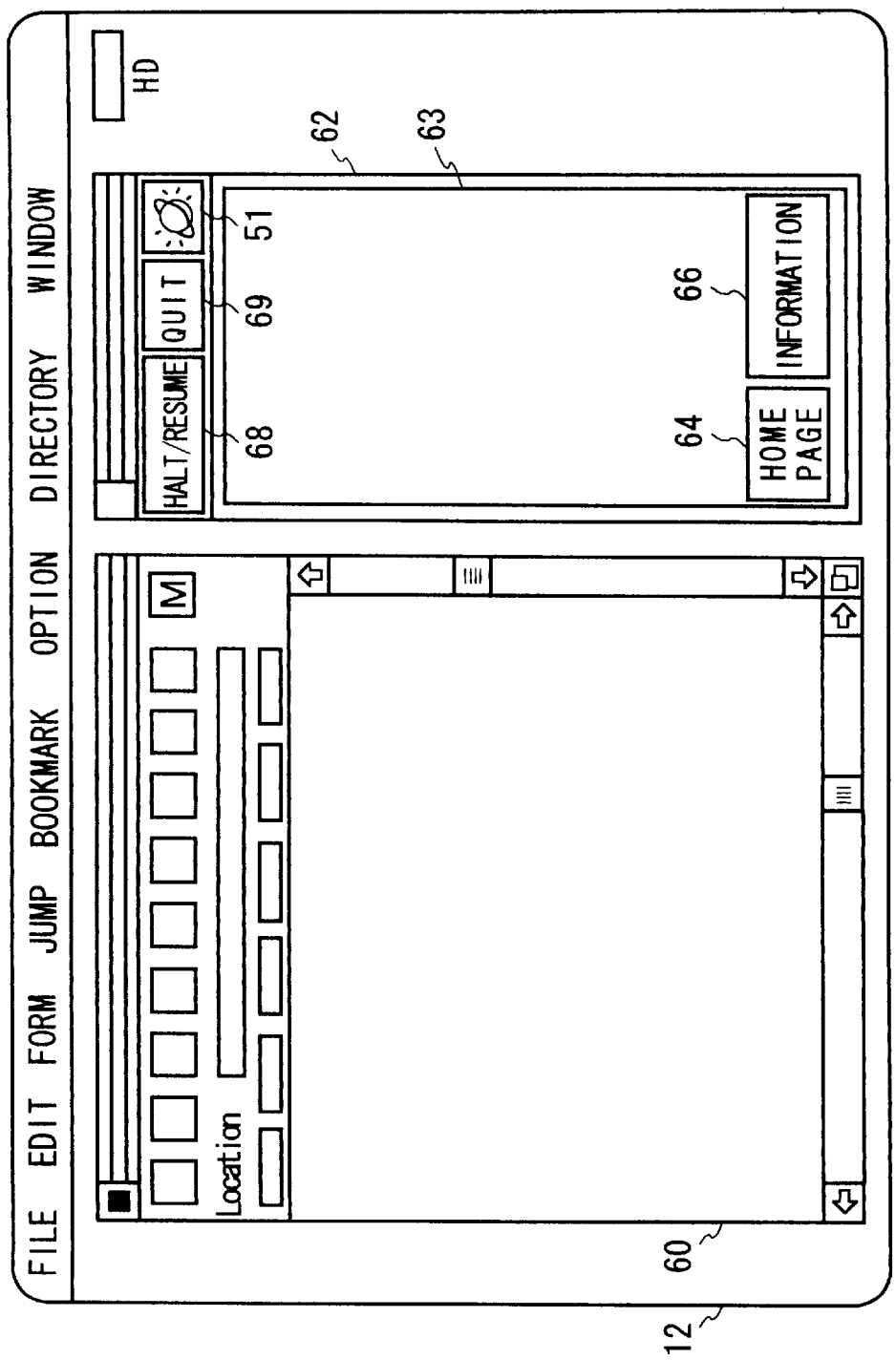
FIG. 7 illustrates a screen display of the display 12.

FIG. 7 is an example of a screen on the display 12. Two windows are opened on the display 12: one is a browser window 60 for the browser 74, and the other is a message viewer window 62 for the message viewer 76. The browser window 60 displays information received from Internet 32. Suitable examples of the browser 74 include Netscape (trademark) and Mosaic (trademark).

The message viewer window 62 has a logo image 51 indicating the information provider with which the terminal is communicating, a home page button 64, an information request button 66, a halt/resume button 68 and a quit button 69. The message viewer window 62 displays a message received from the information provider 20. Each of the above buttons can be displayed as a part of either the message viewer window 62 or the message 63. In this embodiment, the halt/resume button 68 and the quit button 69 are displayed as parts of the message viewer window 62. The home page button 64 and the information request button 66 are displayed as parts of the message 63.

When the home page button 64 is selected, the home page which corresponds to the message displayed within the message viewer window 62 is displayed within the browser window 60. When the information request button 66 is selected, data corresponding to the message displayed within the message viewer window 62 is transmitted to the user. The message viewer window 62 displays a new message every predetermined period of time (e.g., every 60 seconds). When the terminal 10 is in the process of receiving a message, the halt/resume button 68 indicates "halt". If the halt/resume button 68 is selected in this state, the message being received is interrupted and the terminal stops message reception. When the terminal 10 is not in the process of receiving a message, the halt/resume button 68 indicates "resume". If the halt/resume button 68 is selected in this estate, message reception starts again. Selecting the quit button 69 causes the message viewer to terminate communication with the message manager 24.

1.3 Operations for Beginning Communication

1.3.1 Connection Sequence

Figure 8:
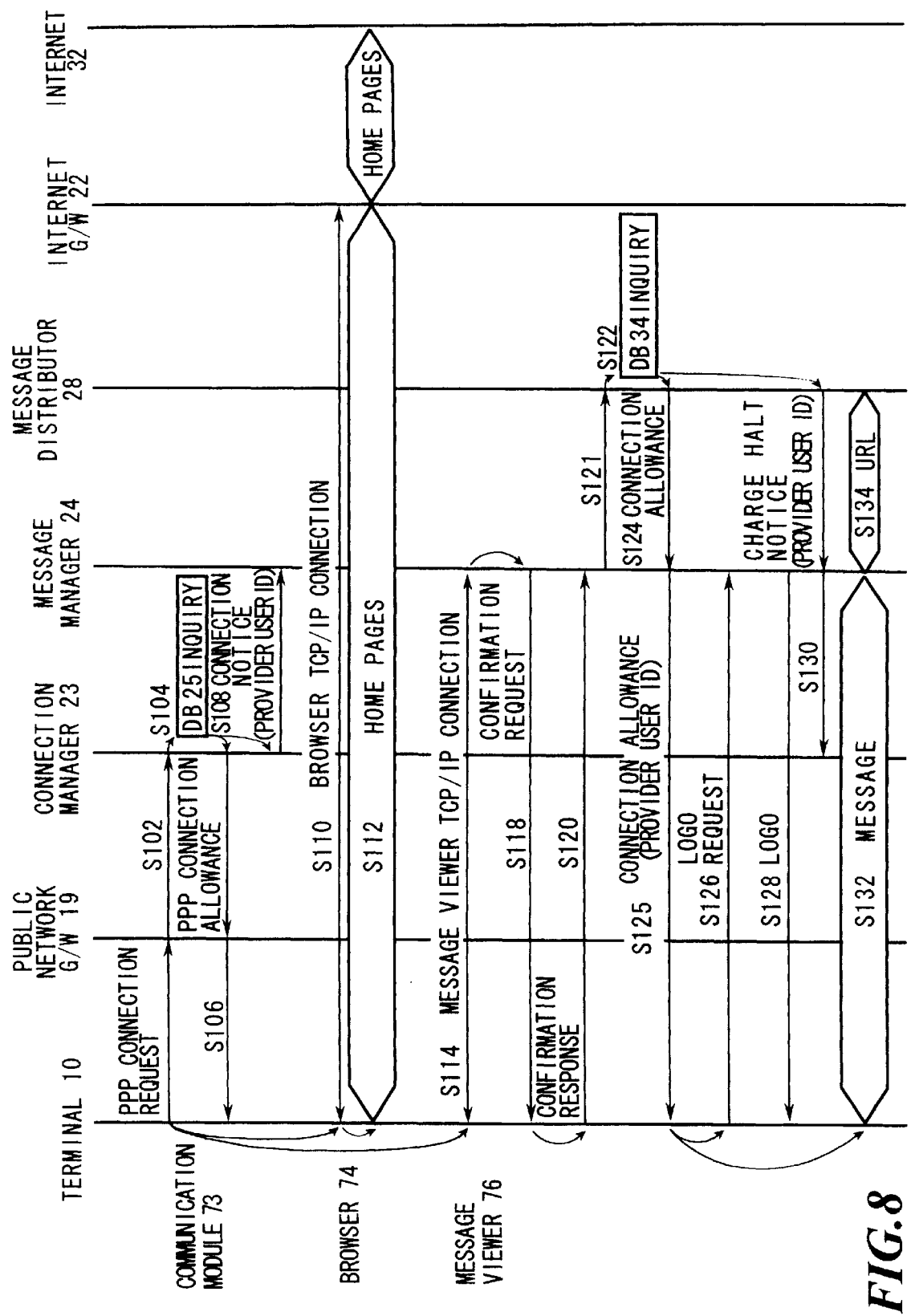
FIG. 8 shows a connection sequence among the terminal 10, message manager 24, etc.

FIG. 8 shows the connection sequence between the terminal 10, the public network gateway 19, the connection manager 23, the message manager 24, the message distributor 28, Internet gateway 22 and Internet 32. When the communication module 73 of the terminal 10 sends a PPP connection request (S102), the connection manager 23 verifies whether the provider user ID and the password of the user who requested the connection have been registered by checking the provider user database 25 (S104).

If the provider user ID and the password have been registered, the connection manager 23 transmits a PPP connection allowance to the terminal 10 (S106), while sending the provider user ID and port number of the PPP connection to the message manager 24. The message manager 24 stores the provider user ID and the corresponding port number of the PPP connection in the RAM 94.

Once the PPP connection is accepted, the browser 74 of the terminal 10 establishes a TCP/IP connection to Internet gateway 22 (S110) in order to communicate with Internet 32 through Internet gateway 22 (S112) The message viewer 76 of the terminal 10 is TCP/IP connected to the message manager 24 (S114). Then, the message manager 24 requests authorization information from the message viewer 76 of the terminal 10 (S118).

Upon receiving the authorization information request, the message viewer 76 transmits the message user ID and password to the message manager 24 (S120). The message manager 24 reads the provider user ID corresponding to the port number of the PPP connection from the RAM 44. Then the message manager 24 transmits the provider user ID, the provider ID for identifying the provider, the message user ID and password (S121) to the message distributor 28.

The message distributor 28 inquires of the message user database 34 whether the received message user ID and the message user password are registered (S122). If they are registered, the message distributor 28 transmits a connection allowance to the message manager 24 (S124), which further sends the connection allowance to the terminal 10 (S125). At this time, the message manager 24 sends its identification information, namely the provider ID and the identification number of the logo image 105, to the message viewer 76 of the terminal 10. The version number of the logo image 105 maybe used as the logo identification number.

The terminal 10 requests the logo image itself from the message manager 24 (S126), if the logo image, which is identified by the provider ID and the logo identification number supplied by the message manager 24, is not stored in the hard disk drive 50. Upon receiving the logo image (S128), the terminal 10 stores the logo image in association with the provider ID and the logo identification number, which were received at step S125. Then, the message distributor 28 notifies the connection manager 23 to stop charging the user who has the provider user ID received at S121 (S132). At this point, message communication is performed among the terminal 10, the message manager 24 and the message distributor 28 (S132).

Figure 9:
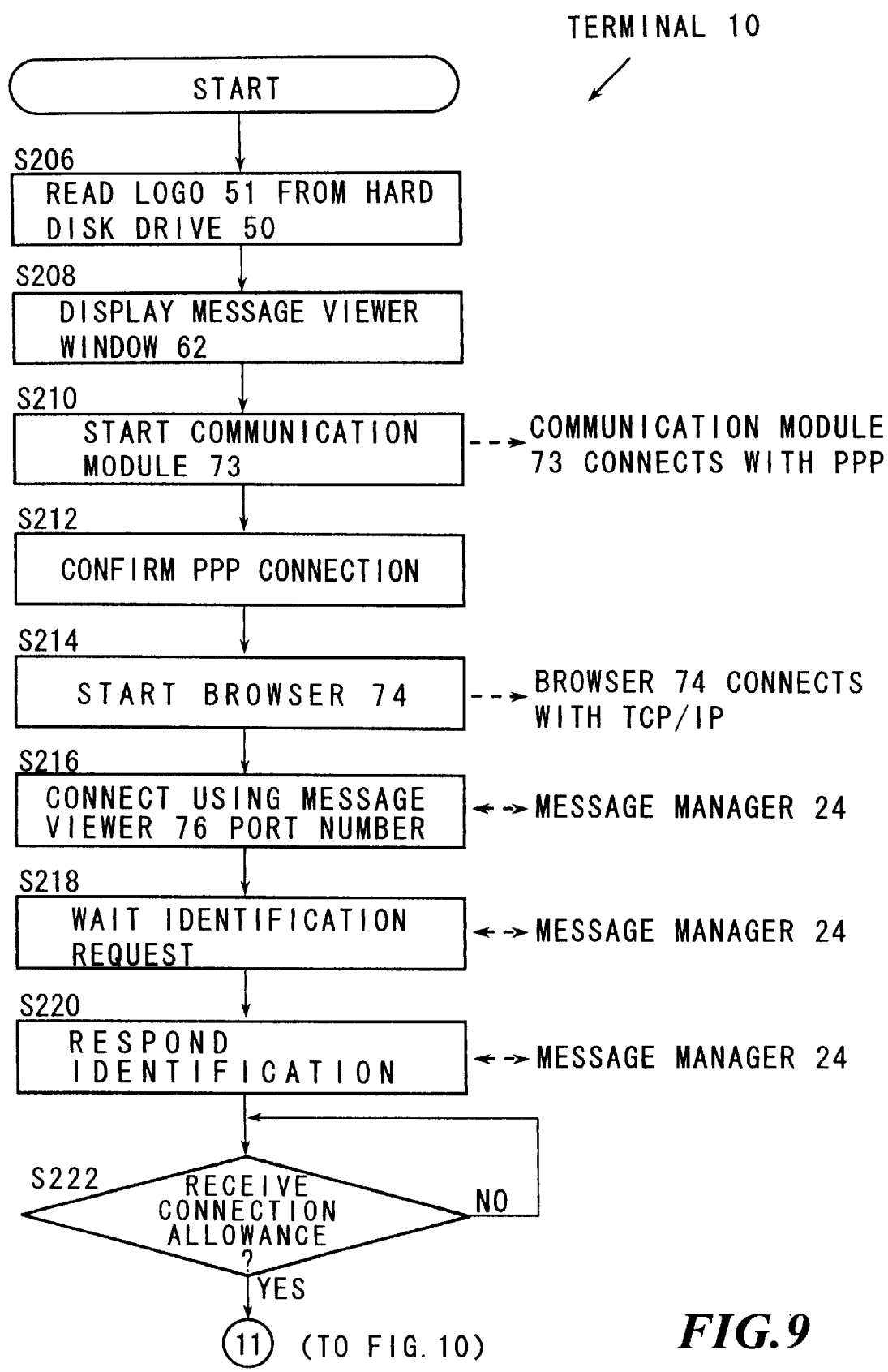
FIG. 9 is a flowchart of a connection process of the terminal 10.

1.3.2 Operation of Terminal 10 in the Connection Sequence
1.3.2.1 Establishing Connection FIGS. 9 through 11 and 13 through 14 show the operations of the respective apparatuses in the connection sequence shown in FIG. 8. FIG. 9 shows the operation flow of the connection module 78 of the message viewer 76 in the terminal 10. The connection module 78 begins its operation when the message viewer 76 is activated. The connection module 78 reads the most recently displayed logo image 51, from the hard disk drive 50 (S206), and displays the message viewer window 62 together with the logo image 51 (S208). If the most recently display logo image 51 has not been stored in the hard disk drive 50, the default image previously stored in the hard disk drive 50 is read and displayed as logo image 51.

Then the connection module 78 activates the communication module 73 (S210). This causes the communication module 73 to make a PPP connection with the public network gateway 19 using the provider user ID and the provider user password. Having confirmed the PPP connection (S212), the connection module 78 starts the browser 74 (S214), which establishes a TCP/IP link between the browser 74 and Internet gateway 22. The connection module 78 is TCP/IP connected with the message manager 24 using a unique TCP/IP port number assigned to the message viewer 76 (S216).

Independent links are established between the browser 74 and Internet gateway 22, and between the message viewer 76 and the message manager 24. These two separate links use different TCP/IP port numbers. This allows the message viewer 76 to display a message without losing any essential functions of the browser. When verification is requested by the message manager 24 (S218), the message viewer 76 transmits the message user ID and the message user password as verification (S220). Once the message manager 24 allows the connection (S222), the message viewer 76 starts the message request module 80 to start message communication.

1.3.2.2 Changing the Logo Image

Figure 10:
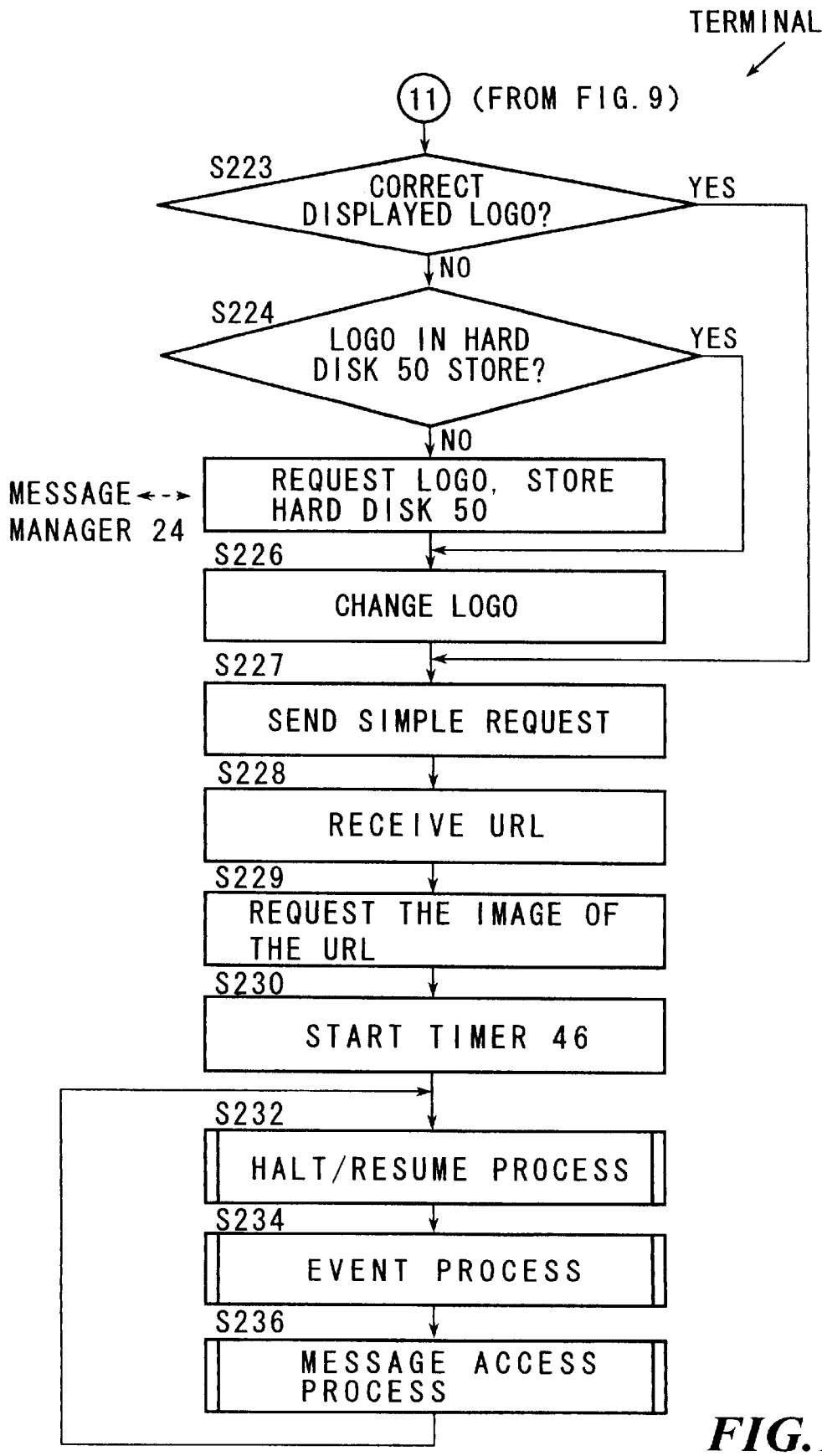
FIG. 10 is a flowchart of a message request operation of the terminal 10.

FIG. 10 shows the operation of the message request module 80. The message request module 80 reads the provider ID and the logo identification of the information provider with which the terminal is communicating, from the connection allowance received at S222. The message request module 80 further determines whether the provider ID and the logo identification are the same as those of the logo image displayed at S206 (S223). Here, the logo image identifies the type of the information provider with which the terminal is communicating. When there is only one information provider 20 of the given type, the logo image identifies one information provider. If the provider ID and the logo identification are not same as those of the displayed logo image, the image needs to be changed. In this case, the terminal determines whether the logo image identified by the received provider ID and the logo identification is stored in the hard disk drive 50 (S224).

If the logo image is not stored in the hard disk drive 50, the message request module 80 requests the logo image from the message manager 24. The request module 80 stores the received logo image in the hard disk drive 50 in association with the provider ID of the information provider 20 and the logo identification (S225). Then the message request module 80 reads the logo image from the hard disk drive 50 to change the logo image within the message viewer window 62 (S226). If the terminal could not receive the logo image at S225, another logo image associated with the same provider ID is searched for from the hard disk drive 50 to be displayed within the message viewer window 62. If the logo image was not received at S225 and the logo image of the provider has not stored in the hard disk drive 50, a predetermined logo image is displayed as a default image.

Therefore, the message viewer window 62 can display the logo image of the information provider 20 in communication with the terminal, regardless of the message displayed in the message viewer window 62. A user can tell which information provider 20 he is connected to. In this embodiment, the terminal determined whether the logo image of the information provider 20 in communication with the terminal 10 is displayed. As an alternative in other embodiments, the information provider may determine this. In this case, the information provider 20 does not transmit its provider ID and the logo identification to the terminal 10 when transmitting the allowance.

Instead, the terminal 10 transmits the provider ID and the logo identification of the logo image displayed at S223, to the information provider 20. The information provider 20 determines whether the received provider ID is its ID and whether the logo identification correctly identifies the logo image to be displayed, and notifies the terminal 10 of its results. When the terminal 10 is not displaying the correct logo, the provider ID of the information provider 20 and a correct logo image are transmitted to the terminal 10 together with the result of the determination (S222). The terminal 10 determines whether the logo image identified by the received provider ID and the logo identification are stored in the hard disk drive 50 (S224). The terminal 10 requests the logo image from the information provider 20 if it is not stored in the hard disk drive 50 (S225).

1.3.2.3 Displaying the Initial Message

The message viewer 76 transmits a simple information request to the message manager 24 (S226). A simple information request is a signal representing a request for quick transmission to the terminal 10. Upon receiving the simple information request, the message manager 24 selects the proper message URL from the message database 26 to transmit to the terminal 10. The terminal 10 receives the URL (S228) and requests the image defined by the URL (S229). The received image is stored in the image buffer 85 provided in the RAM 44 or the hard disk drive 50 of the terminal 10.

For a simple information request, the message manager 24 does not search for a message based on the user information stored in the message user database 34. The purpose of a simple information request is to display the first message quickly, that is, to reduce the time when there is nothing displayed in the message viewer window 62. As a modified embodiment, the first message may be searched for based on a portion of the user information when a simple information request is received. Simplifying the search conditions allows the message to be retrieved quickly.

Next, the connection module 78 starts the timer 46 (S230), which counts out the period for displaying the message. The connection module 78 executes the terminal halt/resume process (S232), the terminal event process (S234), and the message access process (S236) in a recurring cycle.

1.3.3 Operation of Connection Manager 23 in the Connection Sequence

Figure 11:
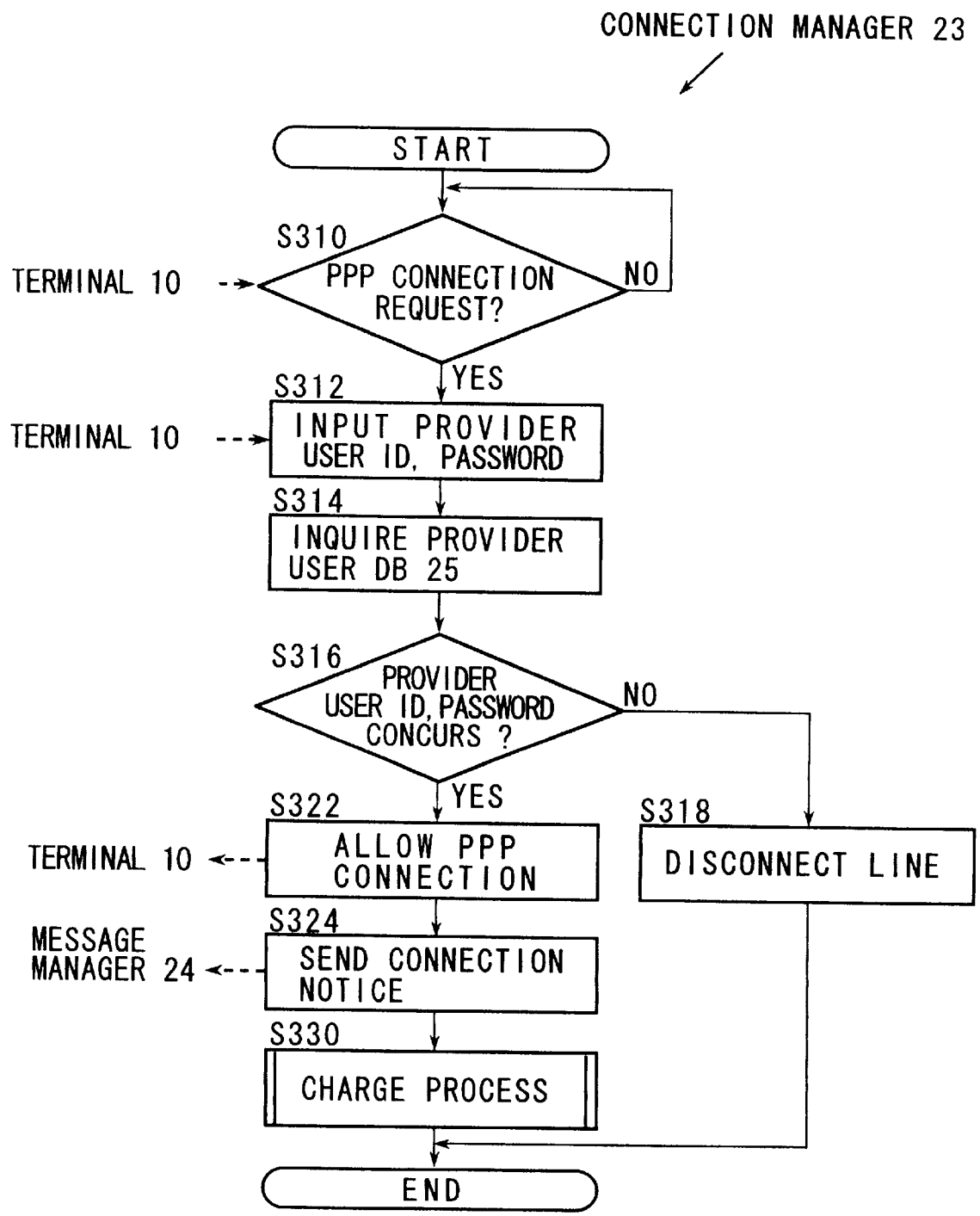
FIG. 11 is a flowchart of a connection process of the connection manager 23.

FIG. 11 shows an operation flowchart of the connection manager 23 in the connection sequence shown in FIG. 8. When a request for a PPP connection is transmitted through the public network gateway 19 from the terminal 10 (S310), the connection manager 23 requests the provider user ID and password from the terminal 10 (S312). Upon receiving the provider user ID and password, the connection manager 23 checks the provider user database 25 to verify whether the provider user ID and password are registered (S314).

FIG. 12 shows the provider user database 25 storing the provider user ID, the provider user password, the total amount of chargeable time, and the chargeable fee, for each provider user. If the provider user ID and the provider user password received by the connection manager 23 are not registered in the provider user database 25 (S316), the connection manager 23 disconnects the link (S318) and the process ends. If the provider user ID and the provider password are registered in the provider user database 25 (S316), the connection manager 23 allows a PPP connection to the terminal 10 (S322) and transmits a connection notice to the message manager 24 (S324). Then, the process goes on to the charging operation (S330).

1.3.4 Operation of Message Manager 24 in the Connection Sequence

Figure 13:
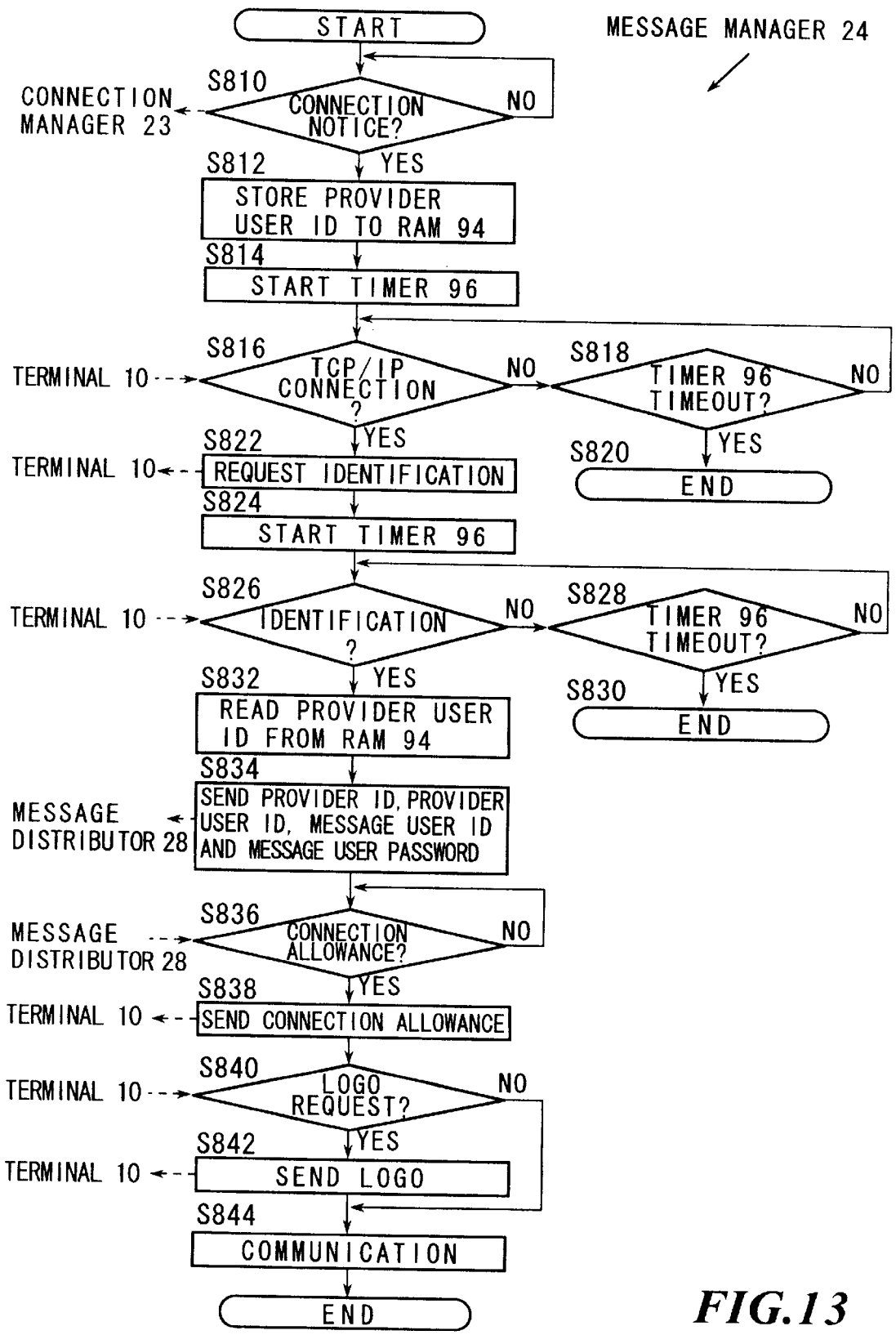
FIG. 13 is a flowchart showing a connection process of the message manager 24.

FIG. 13 shows the operation flow of the message manager 24 in the connection sequence shown in FIG. 8. Upon receiving the connection notice from the connection manager 23 (S810), the message manager 24 records the received provider user ID in the RAM 94 (S812). The message manager 24 starts the timer 96 (S814) to determine whether the terminal 10 has been connected with the message manager 24 (S816) by TCP/IP link. If a TCP/IP link has not been established, the message manager 24 waits (S816, S818). If the timer 96 times out (S818), the process ends (S820).

If at S816, a TCP/IP link has been established, the message manager 24 requests user verification from the message viewer 76 (S822) and resets the timer 96 to start counting again (S824). If the timer 96 times out before the message manager 24 receives verification (S828), the process ends (S830). If the message manager 24 receives verification (S826) before the timer 96 times out the message manager 24 reads out the provider user ID from the RAM 94 (S832) and transmits it to the message distributor 28. The message manager 24 also transmits the provider ID for identifying its own information provider 20, and the message user ID and the message user password received from the message viewer 76 (S834). The message manager 24 transmits a connection allowance notice to the terminal 10 together with the provider identification identifying its own information provider 20 and the logo identification information of the information provider 20 (S838). When the logo image is requested by the terminal 10 (S840), the message manager 24 transmits the logo image of its own information provider 20 to the terminal 10 (S842). Then, the communication starts between the message viewer 76 and the message distributor 28 through the message manager 24 (S844).

1.3.5 Operation of Message Distributor 28 in the Connection Sequence

Figure 14:
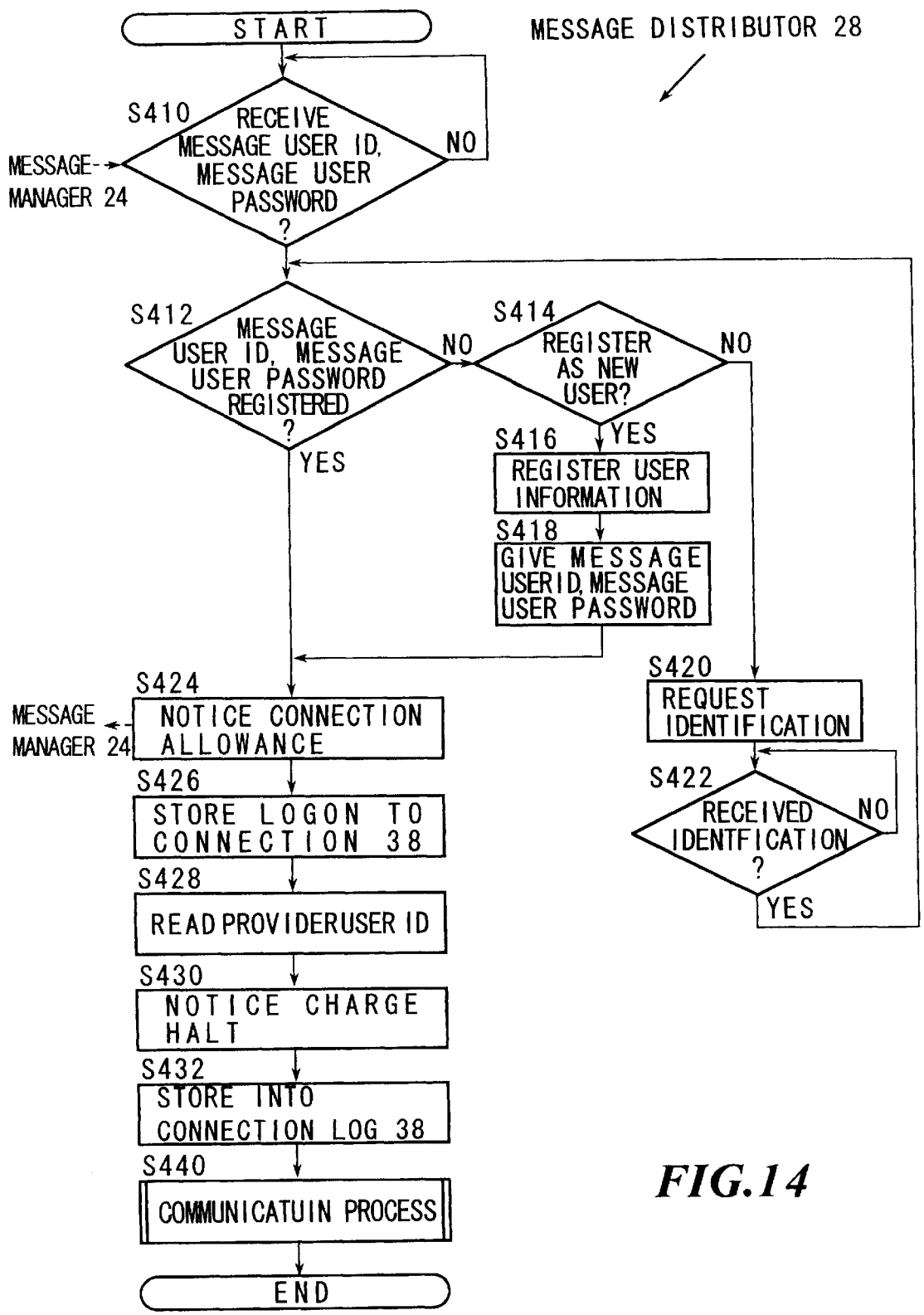
FIG. 14 is a flowchart showing a connection process of the message distributor 28.

FIG. 14 shows the operation flow of the message distributor 28 in the connection sequence shown in FIG. 8. Upon receiving the message user ID and password from the message manager 24 (S410), the message distributor 28 checks the message user database 34 (FIG. 4) to confirm if they are registered (S412). If they are not registered, the message distributor 28 inquires of the message viewer 76 whether the registration should be made, which would establish a new user (S414). If the registration is requested, the message distributor 28 obtains the user information from the message viewer 76 and stores the information in the message user database 34. The message distributor 28 also gives the user the message user ID and the message user password (S418).

If the new user is not registered (S414), the message distributor 28 requests verification from the message viewer 76 (S420) and waits to receive verification (S422). When it receives verification, the process returns to S412 and proceeds to S424. At S424, a connection allowance is sent, and logon is recorded in the connection log 38 (S426).

The message distributor 28 reads the provider ID and the provider user ID received from the message manager 24 (S428) and instructs the information provider 20 identified by the provider ID to stop charging the user identified by the provider user ID (S430). This is recorded in the connection log 38 (S432). Since the message user ID and the provider user ID are independently provided, it is possible to stop the charge solely for the information provider 20 that is in use, without affecting the charging for other information providers which the user is accessing using other provider user IDs. The connection manager 23 stops charging the user identified by the provider user ID. In other words, the connection manager 23 allows the terminal 10 to continue accessing Internet 32 without charge. Then, the message distributor 28 conducts a communication process (S440).

1.4 Operations after Communication Begins 1.4.1 Connection Log

FIG. 15 shows an example of the connection log 38. Provider ID, event (logon, charge stop, etc.) and event occurrence time are recorded in the connection log for each provider user ID. The connection fee of the provider during the charge stop period is paid by the owner of the message distribution system 39. Therefore, the provider user can access Internet for free when the user is viewing a message.

The example shown in FIG. 15 indicates that charge to the provider user was stopped after logon. The message distributor 28 determines the length of time of the charge stop period based on the connection log 38 in order to pay the provider the fee which corresponds to this period of time. The message distributor 28 charges the message provider 30 for the service of displaying the message on the message viewer 76.

If the message viewer 76 is interrupted, the message is not displayed in the message viewer window 62. In this case, the message distribution system 39 cannot charge the message provider because the message is not displayed. However, the message distribution system 39 must pay the user connection fee to the provider as long as the charge to the user is stopped. To avoid this situation, the message distribution system 39 periodically sends the terminal 10 an inquiry as to whether the message viewer is active.

1.4.2 Confirming Message Viewer

Figure 16:
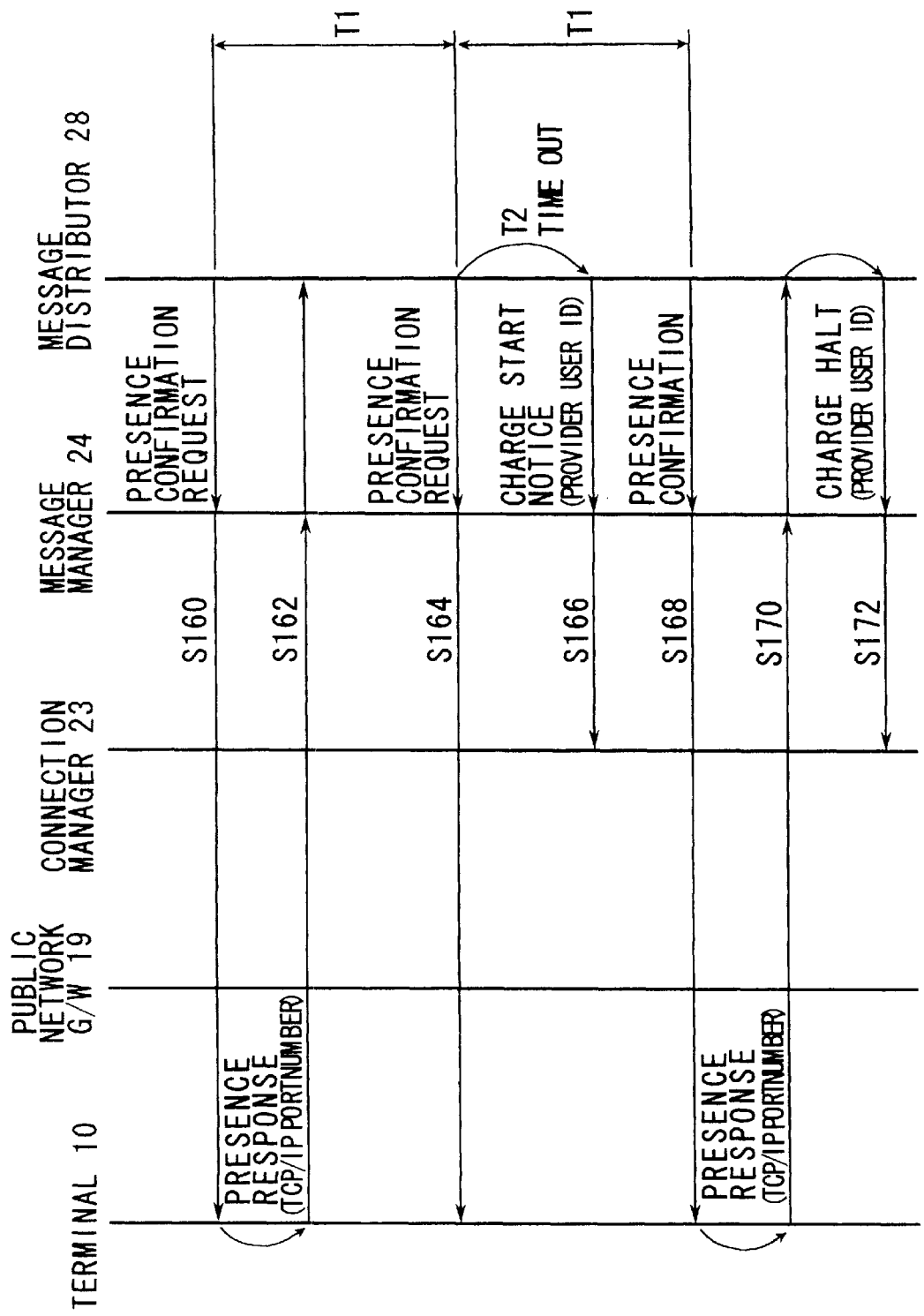
FIG. 16 is a diagram showing the presence confirmation sequence of the message viewer.

FIG. 16 shows the activity confirmation sequence of the message viewer, i.e. the sequence for confirming that the message viewer is active. The message distributor 28 (searcher) transmits an activity confirmation request to confirm that the message viewer is active to every user who is in the charge stop state every period of time T1, by reading the connection log 38 (S160). The message viewer of the terminal 10 responds regarding the activity confirmation request to the message distributor 28 (S162). The message distributor 28 identifies the provider user who has responded, by searching for the TCP/IP port number of the response from the connection log 38. If the message distributor 28 does not receive a response within a predetermined period of time T2 after transmitting the activity confirmation request (S164), the message distributor 28 sends the provider user ID of the user who has not sent a response, to the connection manager 23, which then starts charging that user (S166). If the message viewer responds to an activity confirmation request (S170), the message distributor 28 instructs the connection manager 23 to stop charging the user (S172).

1.4.3 Halting and Resuming Communication

Figure 17:
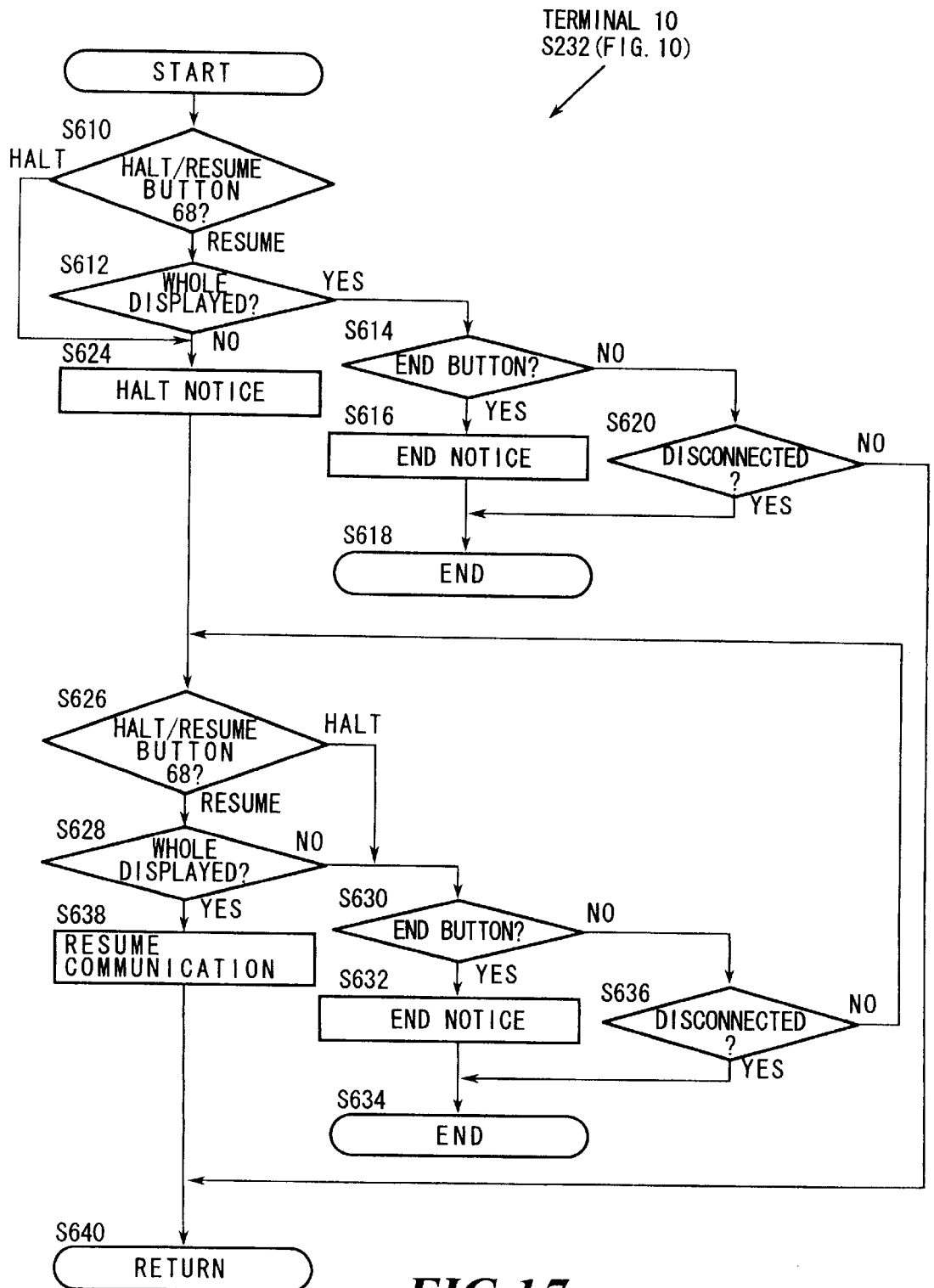
FIG. 17 is a flowchart of the halt/resume process (S232) of FIG. 10 in detail.

FIG. 17 shows details of the halt/resume process (S232) of the message request process of the terminal 10 (FIG. 10). This process is executed by the halt/resume module 82 of the message viewer 76. If, when receiving the message and the URL (S132 and S134 of FIG. 8), "halt" is selected on the halt/resume button 68 (S610) or a portion of the message viewer window 62 is hidden from the display 12 (S612), the halt/resume module 82 stops displaying the message. The message distributor 28 is notified of the interruption of the message display (S624).

Figure 18:
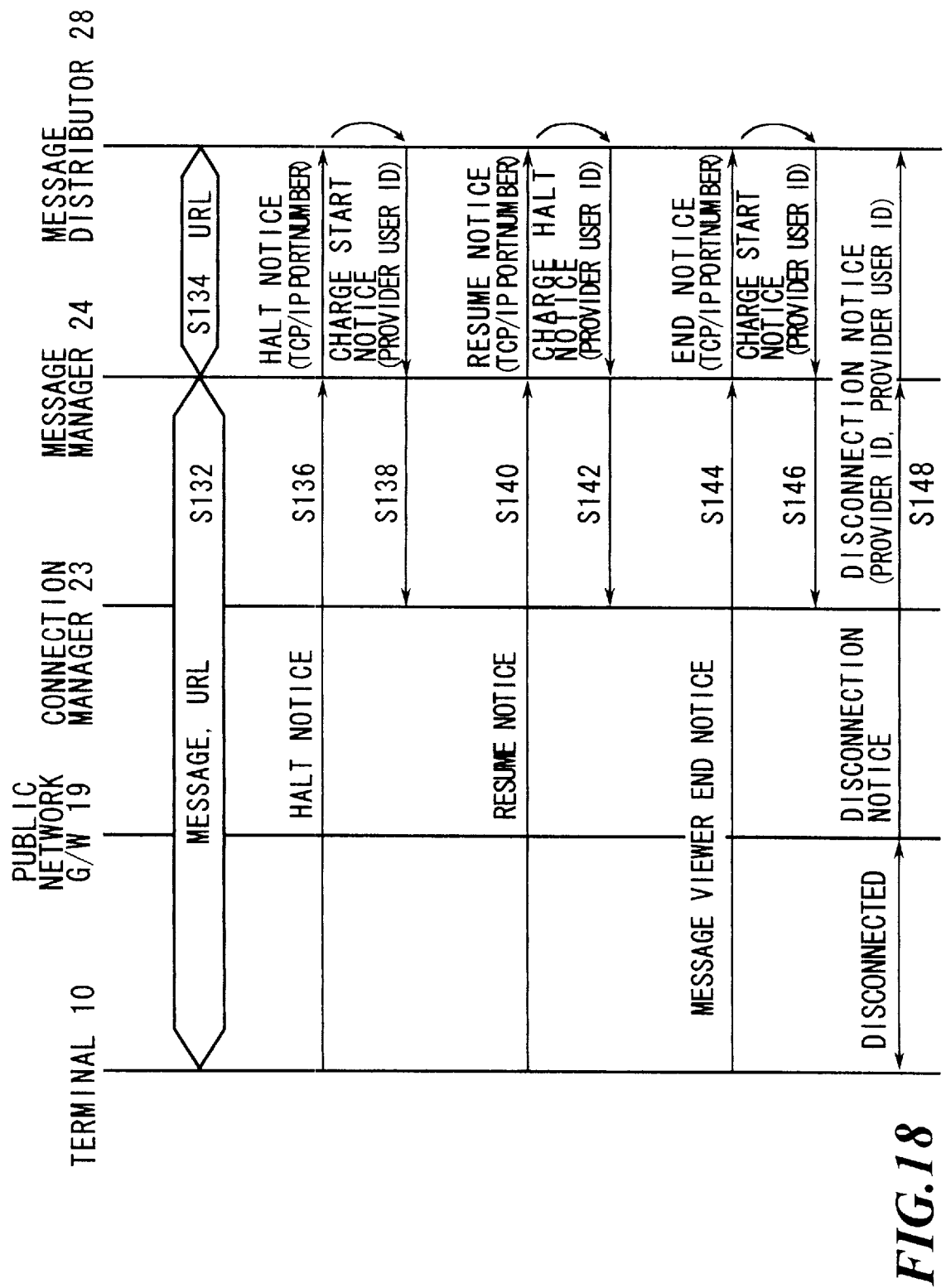
FIG. 18 shows the communication sequence in the halt/resume process.

FIG. 18 shows the message display halt/resume sequence. Upon receiving an interruption notice from the terminal 10 (S136), the message distributor 28 instructs the connection manager 23 to start charging (S138). This means that the user can stop the display of the message by selecting the halt/resume button 68 and paying the regular fee. If a portion of the display conceals itself, the message transmission is automatically interrupted and the user is again charged for the connection. This ensures that the whole message is displayed on the window during message transmission, and that the message provider 30 can reliably provide the message to the user.

Returning to FIG. 17, when receiving the message and the URL (S132 and S134 of FIG. 8), if the halt/resume button 68 is not selected (S610) and if the entire message viewer window 62 is displayed (S612), the process goes to S614. If the quit key 69 is selected at S614, the message manager 24 is notified of the termination of the process (S616) and the process ends. In addition, if the link is disconnected (S620), the process is forced to end (S618). As shown in FIG. 18, if notification of termination of the message viewer 69 is sent from the terminal 10 via the message manager 24 (S144), the message distributor 28 instructs the connection manager 23 to start charging again (S146). If the terminal 10 is disconnected from the public network gateway 19, the connection manager 23 notifies the message distributor 28 of the disconnection.

If, when "halt" is displayed at S626, i.e. during the charge stop period, "resume" is selected on the halt/resume button 68, and if the entire message viewer is displayed on the display 12 (S628), the halt/resume module 82 starts displaying the message again. The connection manager 23 is notified of the start of the message display (S638). As shown in FIG. 18, upon receiving notice of resumption of the message display (S140), the message distributor 28 instructs the connection manager 23 to stop charging the user (S142), and the connection manager 23 stops charging the user. Thus, the user can start displaying the message again for free by selecting "resume" on the halt/resume button 68 to display the entire message viewer window.

If the halt/resume button 68 is in the "halt" state (S626) and the message is not being transmitted, or if the whole message viewer window 62 is not displayed (S628), the process proceeds to S630. If the quit key is selected (S630), the process ends and the message manager 24 is notified of the termination of the process (S632). In addition, if the link is disconnected (S636) the process is forced to end (S634).

1.4.4 Charging Process of the Connection Manager 23

Figure 19:
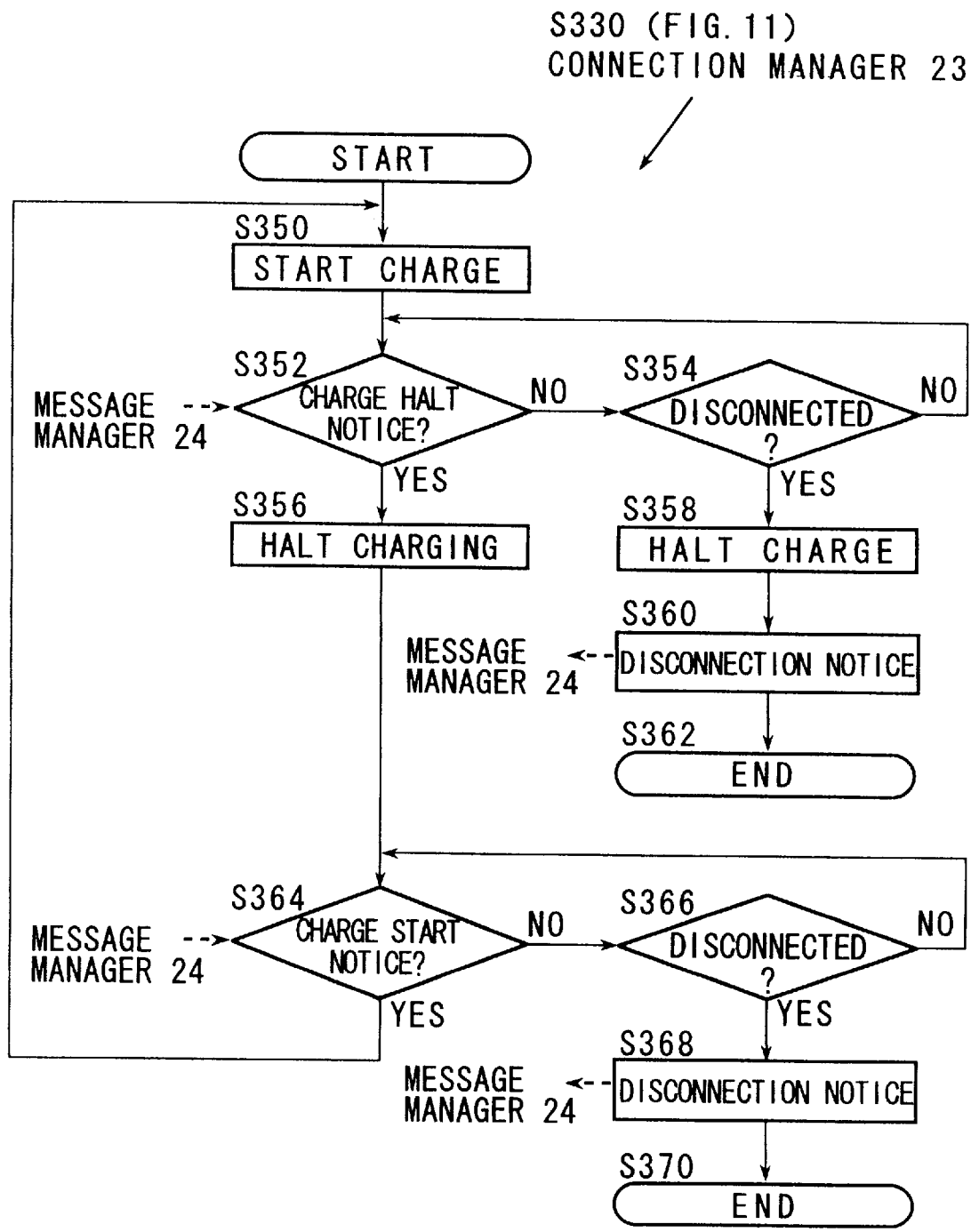
FIG. 19 is a flowchart of the charging process of the connection manager.

FIG. 19 shows the charging process (S330) of the connection manager 23. When the PPP connection is completed (FIG. 11, S324), the connection manager 23 starts charging (S350). Upon receiving a charge stop notice from the message manager 24 (S352), the connection manager 23 stops charging (S356). If the connection manager 23 receives a charge start notice from the message manager 24 (S364), the process returns to S350 to start charging. If, during the charging process, the link is disconnected (S354), the connection manager 23 stops charging (S358) and notifies the message manager 24 of the disconnection (S360). The process ends at S370.

1.4.5 Message Request Process in Terminal 10

Figure 20:
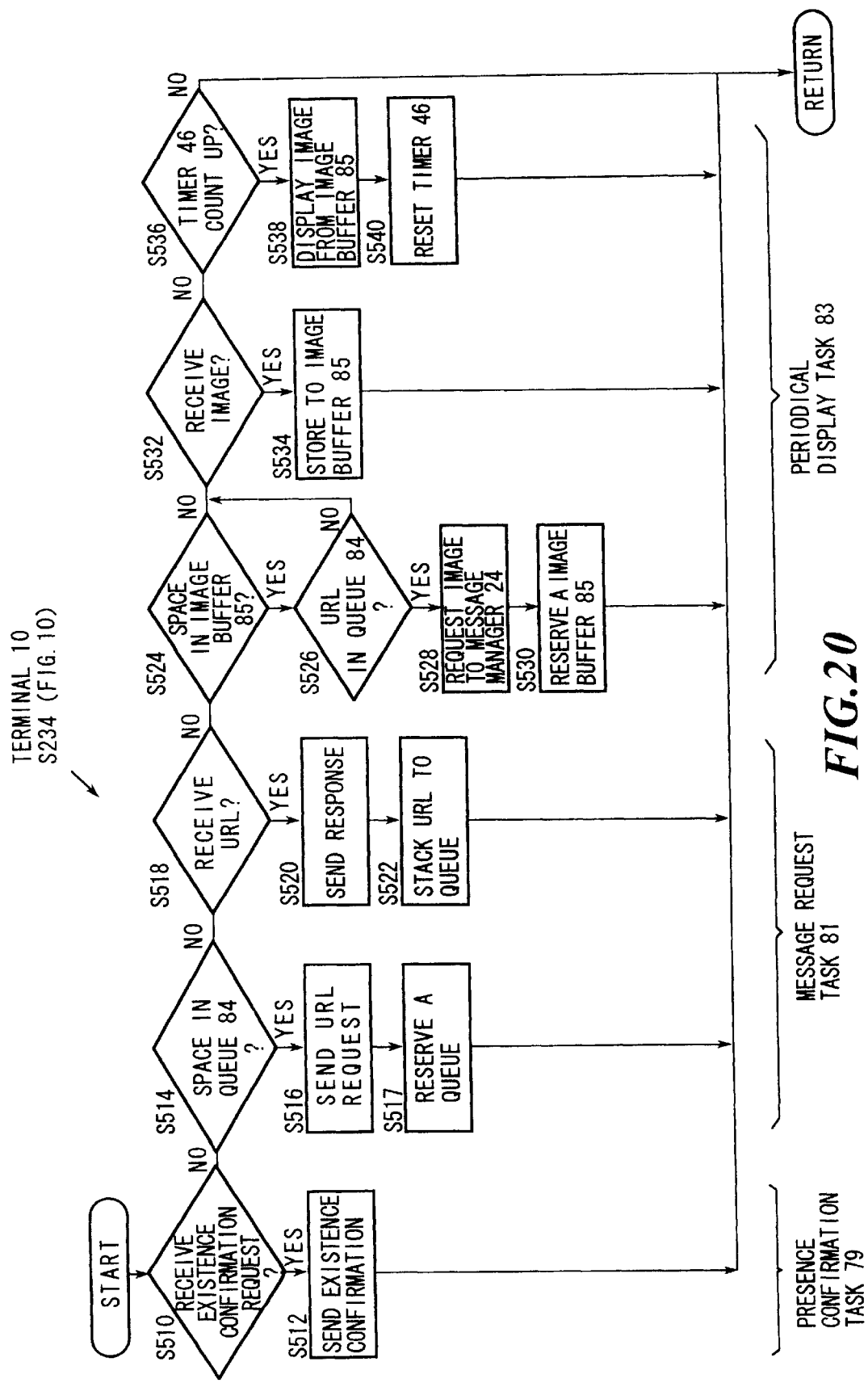
FIG. 20 is a flowchart of the event process (S234) of FIG. 10 in detail.

FIG. 20 shows the event process (FIG. 10, S234) of the terminal 10 in detail. The event process includes an activity confirmation process 79 for informing the information provider 20 whether the message viewer is active, a message request process 81 for requesting a message to be displayed in the message viewer window 61, and a periodical display process 83 for displaying the image received from the information provider 20. These processes are executed by the event process module 86 of the message viewer 76. If an activity confirmation request has been received from the message distributor 28 at S510, the activity confirmation process 79 transmits an activity confirmation (S512).

Steps S514 through S522 comprise the operation of the message request process 81 of the event process module 86. If there are more than a predetermined number of empty locations in the queue 84 (S514), the message request process 81 transmits a URL request (S516) which is to request a message based on the user information of the terminal 10, to the information provider 20 (SS16) and reserve one URL space in the queue 84 (S517). The information provider 20 forwards the received message request to the message distributor 28. When the message identification (URL) is received in response to the URL request (S518), the event module 86 transmits the reception acknowledgement (S520) and stacks the URL in the reserved space in the queue 84 (S522).

Steps S524 to S540 shows the operations of the periodical display process 83 of the terminal event process module.

The periodical display process 83 requests a message (S528) when the image buffer has a vacant space (S524) and the queue 84 has a URL (S526), and reserves a space for a message in the image buffer 85 (S530). The periodical display process 83 stores the received image in the image buffer 85 (S524) when the image (message) is received from the message manager (S532).

When the timer 46 times out (S536), the image (message) which was stored in the image buffer 85 at the earliest time is displayed (S528) and the timer 46 is reset (S540). Therefore, a new message can be displayed on the terminal every period of the timer 46. Since the periodical display process 83 receives the subsequent image while the current image is displayed, users need not wait for message reception. Since the image to be displayed has previously been stored in the image buffer 85, messages can be changed, i.e. new messages can be displayed, very quickly. In particular, even when the data traffic on Internet is heavy and message reception takes time, this system can efficiently prevent users from experiencing delays in reception.

1.4.6 Message Access Process in Terminal 10

Figure 21:
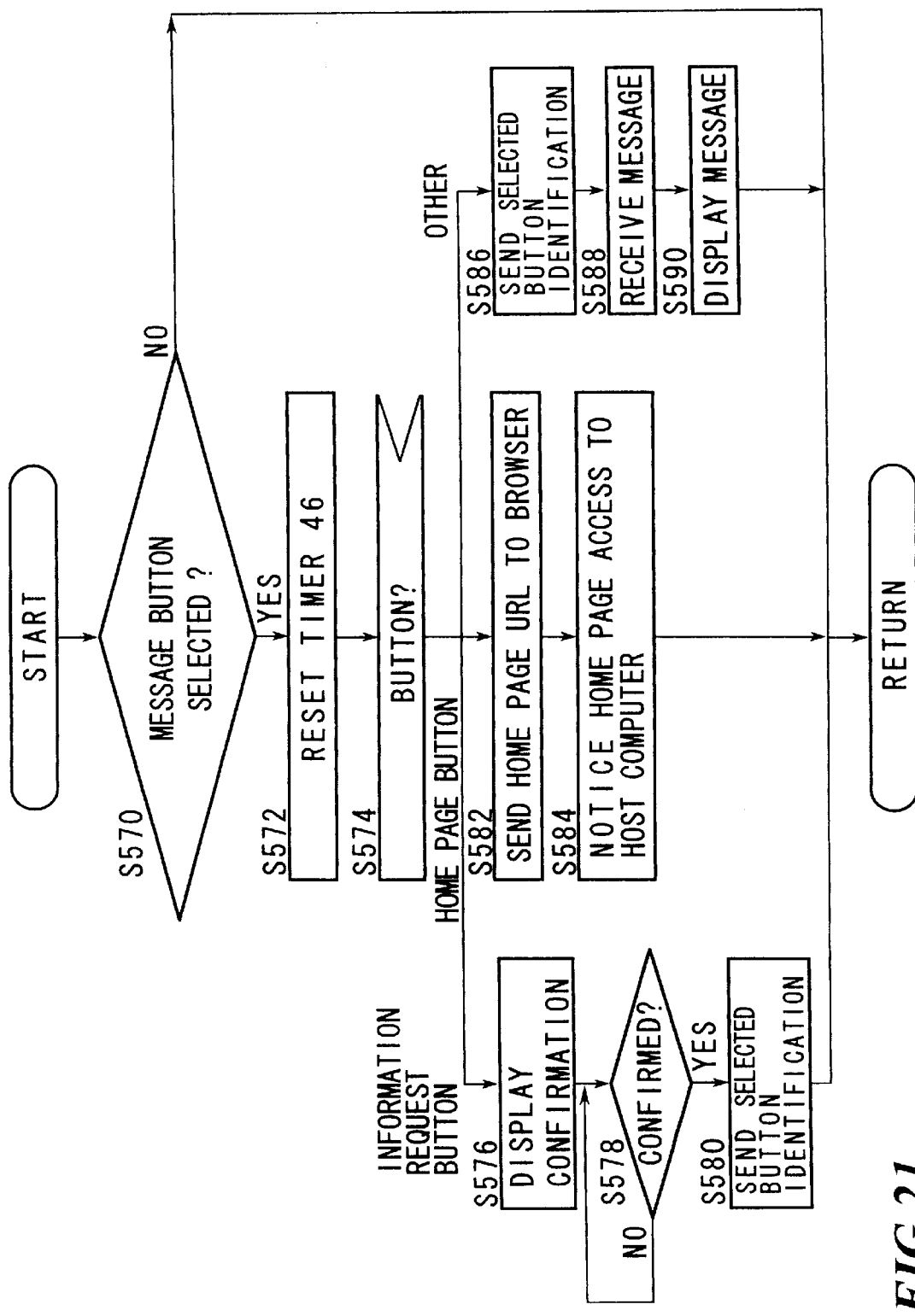
FIG. 21 is a flowchart of the message access process (S236) of FIG. 10 in detail.

FIG. 21 shows a flowchart of the message access process (FIG. 10, S236) of the terminal 10. This process is conducted by the message access module 88 of the message viewer 76. The message access module 88 determines whether the home page, information, or other such button in the message 63 is selected (S570). If none of these buttons is selected, the process returns to the one of FIG. 10. If one of these button is selected, the timer 46 is reset. Here, the timer 46 is set to a longer period than it was at S540 (S572). This causes the message operated on by the user to be displayed on the terminal 10 for a longer period of time. As another embodiment where the home page button 64 and the information request button 66 are displayed as parts of the message viewer window 62, the timer 46 is reset when those buttons of the message viewer window 62 are selected.

Here, the message viewer 76 determines the types of the buttons displayed in the message viewer window 62. If the message is created based on a standard HTML, the type of a button in the message is determined by a comment in the HTML language, related to the button. For example, the button type is determined by the comment written before the data of the button. However, as another embodiment, the button type can be determined by binary data (data which is not used as character code) related to the link data.

The message display process 84 requests the user information from the information provider 20 if the information request button 66 is selected at S574. The message manager 24 of the information provider 20 receives the address and the name of the user from the message distributor 28 and sends them to the terminal 10. The message display process 84 requests and waits for confirmation of the received address and name, from the user, by displaying the received address and name (S576). If confirmation is provided by the user (S578), the information provider 20 is notified that the information request button 66 has been selected (S580).

If the home page button 64 is selected at S574, the URL corresponding to the displayed message is read from the message and passed to the browser 74 (S582). Then, the information provider 20 is notified that the user wants to access the home page (S584). The information provider 20 can identify the message accessed by the user. The browser 74 determines whether the selected home page is already stored in the hard disk drive 50. If the hard disk drive 50 does not have the home page, the browser 74 reads the home page via the modem 16. The read home page is stored in the hard disk drive 50 and displayed on the display 12.

If other buttons are selected at S574, a message indicating the selected button is sent to the information provider 20 (S586). Then the message viewer 76 receives a message corresponding to the selected button from the information provider 20 (S588) and displays the received message within the message viewer 76 (S590). The terminal 10 does not clear other messages already stored in the message buffer 85 at this time. The message request process 81 and periodical display process 83 work independently and concurrently. Therefore, even after a new message is displayed based on the user's operation, the previous message can be displayed from the image buffer 85 instantaneously when the timer 46 times out.

1.4.7 Charging Operation in the Message Distributor 28

Figure 22:
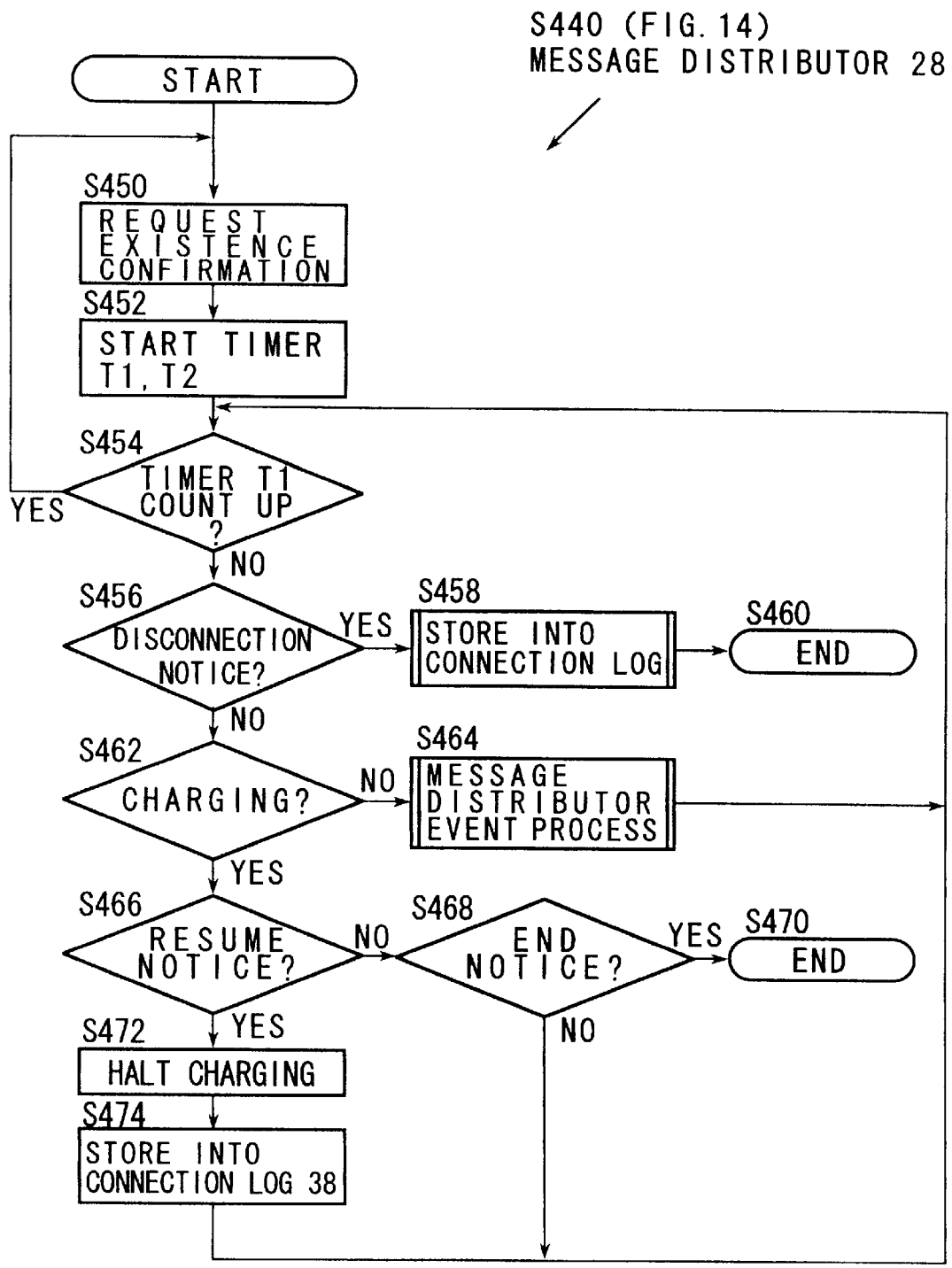
FIG. 22 is a flowchart of the operation of the message distributor 28 after being connected to the message viewer 76 of the terminal 10.

FIG. 22 shows the charging operation of the message distributor 28. The message distributor 28 periodically requests an activity confirmation from the terminal 10 (S450). The message distributor 28 starts the timer T1 for transmitting an activity confirmation request and the timer T2 indicating the maximum time for a response (S452). When the timer T1 times out (S454), the process returns to S450, and the message distributor 28 requests an activity confirmation again. If there is a disconnect notice sent from the message manager 24 (S456), the message distributor 28 records the notice in the connection log 38 (S458), and the process ends.

If there is no disconnect notice, the message distributor 28 determines whether the terminal 10 is being charged at S462. If it is not being charged (i.e., if the message is displayed on the message viewer), the process proceeds to S464 and processes a message distribution system event, the details of which will be described below. After this event is processed, the process returns to S454 to repeat itself. If the terminal 10 is being charged at S462, it is determined whether a resume notice has been received from the message manager 24 (S466). If the message distributor 28 has received a resume notice (S466), the message distributor 28 gives notice to stop charging (S472), which is recorded in the connection log 38 (S474). Then, the process returns to S454. If, at S466, no resume notice has been received, it is determined whether an ending notice has been received from the message manager 24 (S468). If the message distributor 28 has received an ending notice, the process ends (S470). If the message distributor 28 has not received an ending notice, the process returns to S454.

1.4.8 Message Searching Process in the Message Distributor 28

Figure 23:
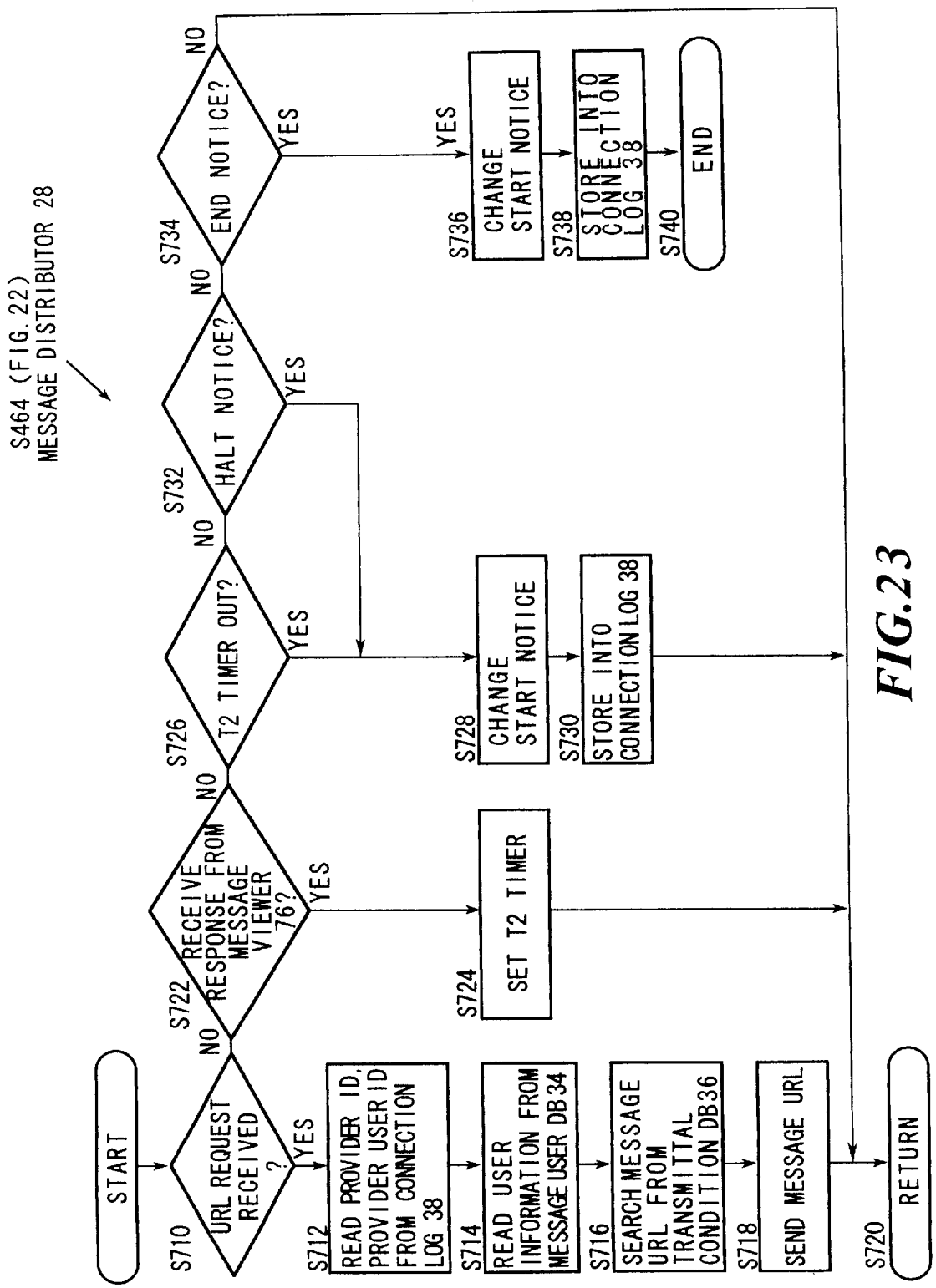
FIG. 23 is a flowchart of the event process (S464) of FIG. 21 in detail.

FIG. 23 shows the event process (S464) of FIG. 22 in detail. Upon receiving a URL request from the message manager 24 (S710), the message distributor 28 reads the provider ID and the provider user ID using the TCP/IP port number contained in the received URL request (S712). Then, the message distributor 28 reads the user information of the message user having the provider ID and the provider user ID, from the message user database 34 (S714). The user information may include the user's date of birth, sex, marital status, occupation and address. A message identification URL, the transmittal conditions of which match the user information, is retrieved from the transmittal condition database 36 (S716) to be transmitted to the message viewer 76 (S718) and the process returns to its place in the sequence shown in FIG. 22 (S720). Since this is a normal message request, the information provider 20 searches for the message URL using the user information so that a message corresponding to the user characteristics can be provided to the terminal 10. The information provider 20 forwards the received URL to the terminal 10.

If there is any response from the message viewer 76, such as an activity confirmation or a command from the message viewer 76 (S722), this means that the message viewer 76 is active. Then, the timer T2 is reset at S724, and the process returns at S720. If the timer T2 times out (i.e., if there is no activity confirmation from the message viewer 76 within the predetermined period) at S726, it is deemed that the message viewer 76 is no longer active. Then, the message distributor 28 gives notice to the message manager 24 to start charging (S728) and records the charge start notice in the connection log 38 (S730). Then, the process returns at S720. If the message distributor 28 receives an interruption notice from the message manager 24 (S732), the message distributor 28 gives notice to start charging (S728), and records it in the log (S730). Then, the process returns at S720. Similarly, if the message distributor 28 receives an ending notice from the message manager (S734), the message distributor 28 gives notice to start charging (S736), and the charge start notice is recorded in the connection log 38 (S738). Then, the process ends at S740.

2. Second Embodiment 2.1 Hardware Construction

Figure 24:
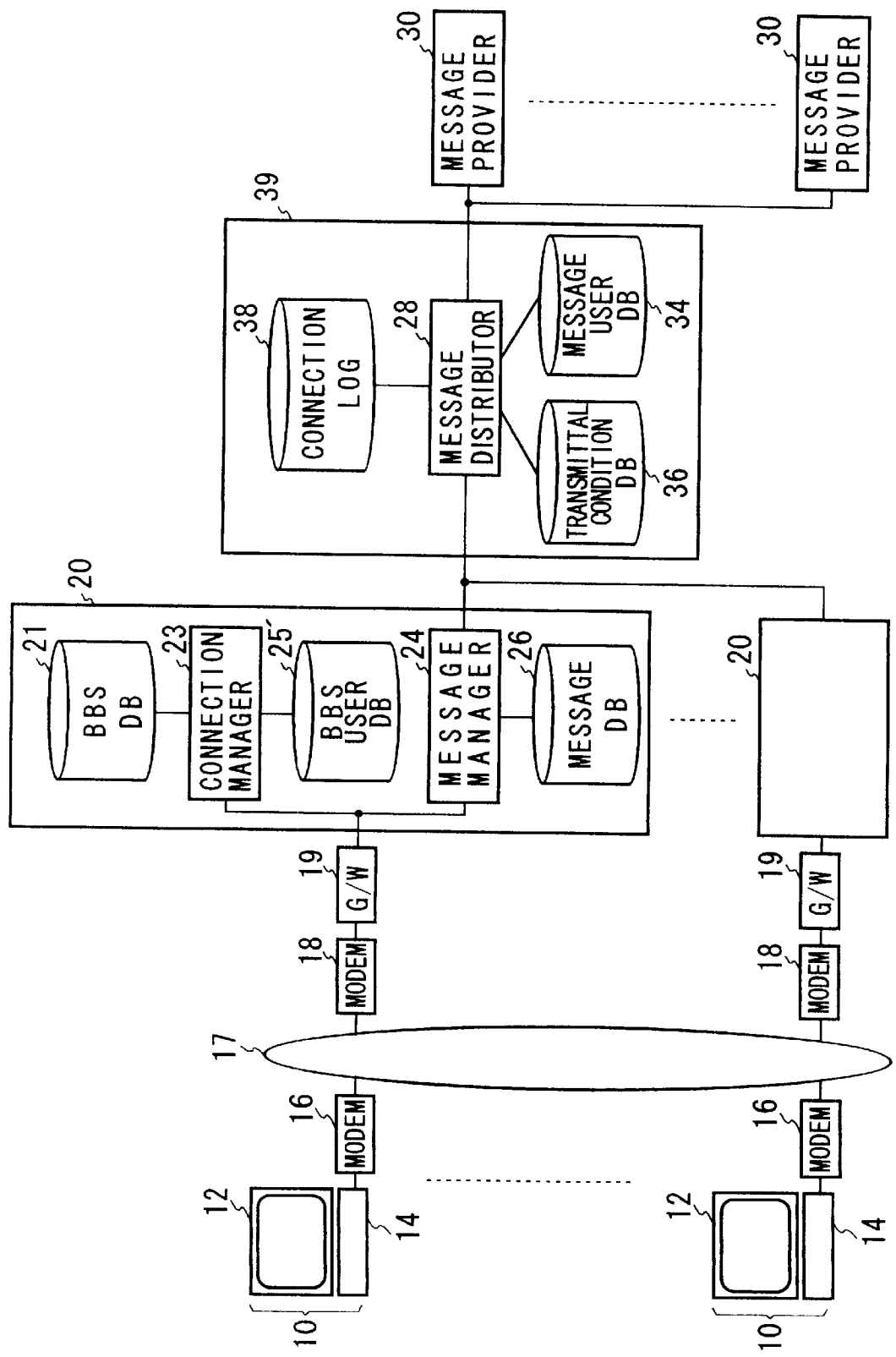
FIG. 24 is a block diagram of a hardware of the overall communications system according to the second embodiment of the invention.

FIG. 24 shows the hardware construction of the second embodiment. In this embodiment, the information provider 20 functions as a computer communication (BBS) provider system, such as PC-VAN (trademark) or CompuServe (trademark), rather than as an Internet provider. In contrast to FIG. 1, Internet gateway 22 and Internet 32 are not connected to the system, but a BBS database 21 is connected to the connection manager instead. Also, a BBS user database 25' is provided instead of the provider user database 25. The browser 74 works as terminal software for communicating with the BBS.

The structures shown in FIGS. 2 through 5 are common for the first and second embodiments and their explanations are therefore eliminated here. In FIG. 6, character-based or image-based communications software for communicating with a BBS is used as a browser 74. In this embodiment, the browser 74 communicates with the connection manager 23.

2.2 Operation

Referring to S110 of FIG. 8, the browser 74 is TCP/IP connected to the message manager 24. The browser 74 transmits and receives data to and from the message manager 24 in the second embodiment (S112). The structures shown in FIGS. 9 through 11 and FIGS. 13 through 23 are the same as those of the first embodiment: hence explanation for them will be omitted. The structure of the BBS user database 25' is also the same as that of the provider user database of FIG. 12. However, in this embodiment, a BBS ID, BBS user ID and BBS user password are used instead of the provider ID, provider user ID and provider user password.

Independent links are established with the BBS database 21 and the message database 26. Therefore, even when information is being received from the BBS, other information which is independent of the BBS can be displayed on the message viewer window 62. The connection fee charged by the BBS can be controlled based on the display status of the message viewer window 62. The BBS connection fee is charged to the message provider 30 when an advertisement is displayed on the message viewer window 62, without charging the user.

Although two logical links were established by TCP/IP in the above embodiments, other types of links may be adopted for establishing different data links from the browser 74 and the message viewer 76 to the connection manager 23 and the message manager 24.

3. Third Embodiment

Figure 25:
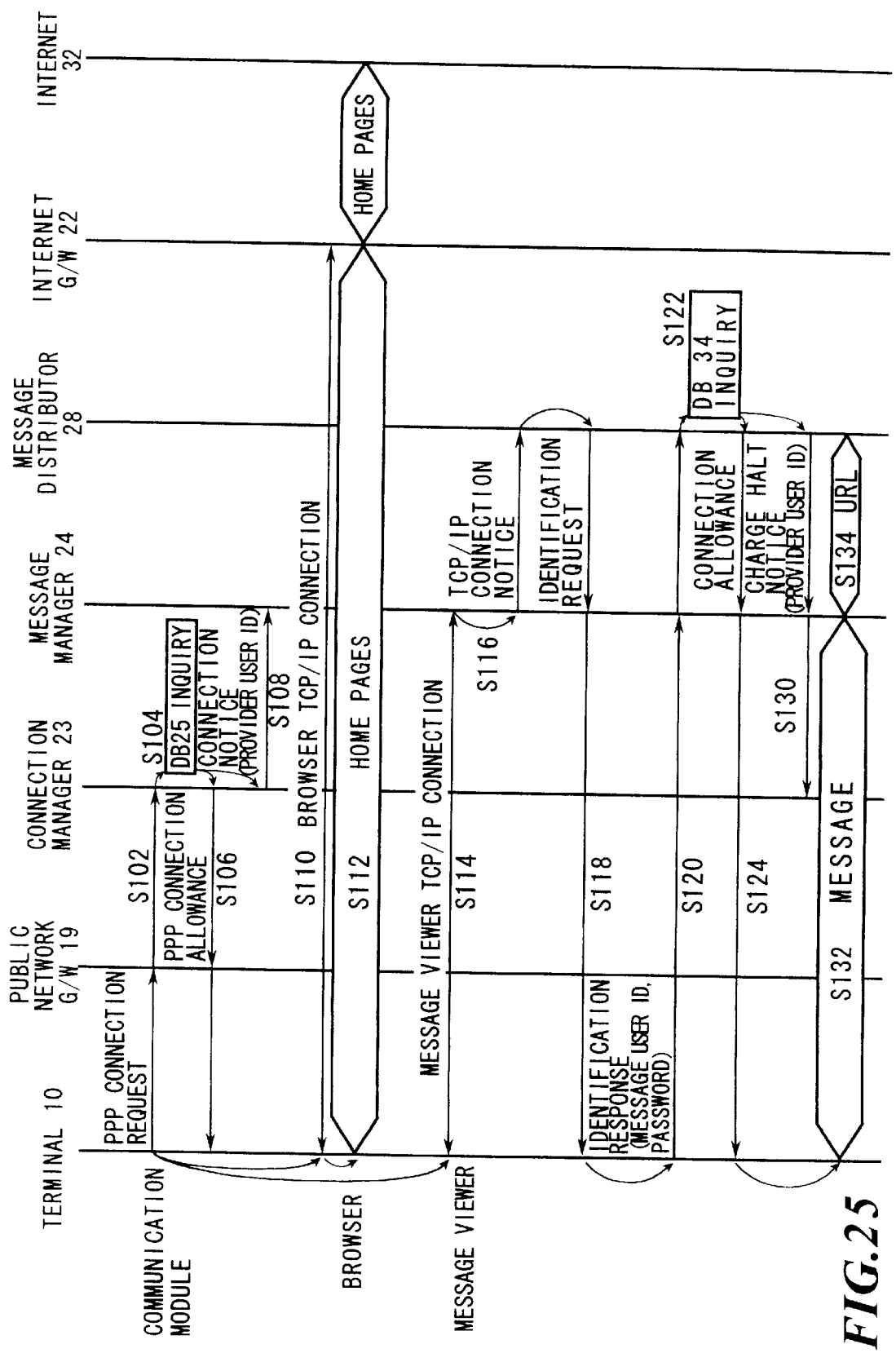
FIG. 25 is a diagram showing the communication sequence in the third embodiment.

FIG. 25 shows the connection sequence of the third embodiment. The hardware and file structures of this embodiment are the same as those of the first embodiment. In this embodiment, when the message viewer 76 is TCP/IP connected to the message manager 24 (S114), the message manager 24 makes the timer 96 stop counting, while notifying the message distributor 28 of the TCP/IP link (S116).

Upon receiving such notification, the message distributor 28 sends a verification request to the message manager 24 (S118). The message manager 24 forwards the verification request received from the message distributor 28 to the message viewer 76 of the terminal 10 (S118). The other operations of this embodiment are the same as those in the first embodiment, and explanation of them will therefore be omitted.

In this embodiment, the connection operations are administered by a single message distributor 28 after the TCP/IP link (S114 and S116) is established. Therefore, the verification request sequence in the several message managers can easily be modified by changing the software operation of a single system.

4. Other Embodiments

Various modifications can be made to the above embodiments. Some such modifications are described below.

4.1 Charge Initiating Timing

In the above embodiments, when the message viewer window 62 disappears, charging starts when the message in the message viewer window 62 is displayed. Alternatively, charging may start when more than a predetermined area of the message and the message viewer window 62 disappears. In this case, the user can use more of the area of the display 12.

An alert may be sent to the user when more than a predetermined area of the message or the message viewer window 62 disappears. If the user does not respond to the alert within a predetermined period of time, charging may start. This would prevent a user's mistake or unintended action from triggering the start of charging. As a still further modification, if the user does not respond to the alert within the predetermined time period, the message manager 24 may instruct the connection manager 23 to slow down the speed of access to Internet. If the user still ignores the alert, charging may start. Slowing down the access speed could remind the user to display the message. As an alternate embodiment, when the halt/resume button 68 is hit, no alert is generated and the access speed is not reduced even if a portion of the message (display) larger than the predetermined size disappears. In this case, the user can continue accessing Internet 32 as usual.

4.2 Function of Browser 74

In the above embodiments, the browser 74 displayed the home pages received from Internet 32. However, the browser 74 may be employed with an Internet telephone or Internet TV phone which allows voice communication through Internet. Even when the browser 74 does not display anything on the display, the message distributor 28 can control the operation for charging for the connection to Internet, in a manner similar to that of the above-described embodiments. According to the above embodiments, a passive image, which is to be sent to the terminal not in response to a specific operation by the user, can be displayed on the terminal. Therefore, a telephone function can also be provided at low cost, according to the present invention.

The browser 74 may also display on-demand video information. In this case, a video providing system is substituted for Internet gateway 22, and charging for the on-demand video service may be stopped during the display of additional information. This can provide inexpensive on-demand video information to the user. In the above embodiments, the browser 74 and the message viewer 76 respectively communicated with their counterparts using two logical links provided on one physical link. However, the browser 74 and the message viewer 76 may communicate with their counterparts using physically different links.

4.3 Database Construction

Although the message user database 34, the transmittal condition database 36 and the connection log 38 are shown as independent disk drives, databases of the same apparatus may be stored in a single disk drive. The same relationship among the data of the respective fields can be realized by various file structures. For example, the message user database 34, the transmittal condition database 36 and the connection log 38 may be arranged in different areas of a single file. The count value of the timer may be divided by the hardware or the software, and the divided value may be used as the count value for various timers. In this case, the count value of the timer may be set as a parameter of the software.

The message user database 34 may store Internet home page addresses Internet and the categories of the home pages, instead of the message user ID and the user information. In this case, the message transmittal condition database 36 stores the message ID in association with the category of the message. The terminal 10 reads the address of the home page displayed within the browser window 70. The home page address is transferred from the message viewer 76 to the message distributor 28. The message distributor 28 determines the category of the home page using the received home page address and searches for another message in the same category, from the message transmittal condition database 36. In this embodiment, messages related to the information actively selected by the user can be transmitted to the user even when the user information is not previously stored.

4.4 User Identification

Although the user of the message was identified by a message user ID and password in the above embodiment, a provider user ID may be used instead of the message user ID. This simplifies both the identification of and the operation by the message user. However, in this case, the user information must be recorded several times if the same user uses a plurality of providers. On the contrary, the system of the above embodiment allows the user to use a plurality of providers by registering the user information once. Further, in the above embodiment, the password can be omitted. This further simplifies verification of the message user.

4.5 Recording Medium

The floppy disk 56 or the CD-ROM 58, as examples of recording medium, may store a portion or all of the functions of the terminal 10 operation, which has been described above. The floppy disk 106 may also store a portion or all of the functions of the other apparatus operations and flowcharts. These programs may be read out directly from the recording medium to the RAM for execution. Besides floppy disks and CD-ROM, the invention may use as a recording medium an optical recording medium, such as a DVD, a magnetic recording medium, such as an MD, an opto-magnetic recording medium, such as a PD, a tape medium, or a semiconductor memory, such as an IC card or a miniature card.

According to the above embodiments, the following recording medium can be provided.

1. A recording medium storing a program which causes a terminal to receive a message from an information provider connected to Internet, comprising:

a means for causing the terminal to request a first message from the information provider and display the first message on the terminal; and a means for causing the terminal to request a second message from the information provider, such that the second message is more related to the user of the terminal than the first message.

2. A recording medium storing a program which causes a terminal to receive a message from an information provider comprising:

a means for causing the terminal to receive a first message from the information provider and display the first message on the terminal;

a means for causing the terminal to receive a second message from the information provider when the first message is displayed on the display means; and a means for causing the terminal to switch the display from the first message to the second message.

3. A recording medium storing a program which causes a terminal to receive a message from an information provider connected to Internet which stores home pages, the program comprising:

a means for causing the terminal to activate a communication module that establishes a PPP connection to the information provider;

a means for causing the terminal to activate a browser which displays the home pages, the browser causing the terminal to establish a first TCP/IP link using a first port number on the PPP connection; and a means for causing the terminal to establish a second TCP/IP link using a second port number on the PPP connection, the second port number being different from the first port number.

4. A recording medium storing a program which causes a terminal to receive a message from an information provider connected to Internet which stores home pages, the terminal having a browser for displaying the home pages, and the program comprising:

a means for causing the terminal to receive the message from the information provider and display the message on the terminal, a means for causing the terminal to display a button which designates a home page of the provider of the message displayed on the terminal, an identification of the home page being included in the message, a means for causing the terminal to read the identification from the message when the button is selected; and a means for causing the terminal to send the identification read from the message to the browser for displaying the home page.

5. A recording medium according to item 4, further comprising means for causing the terminal to send information indicating that the home page has been accessed, to the information provider.

6. A recording medium storing a program which causes a terminal to receive a message from an information provider connected to Internet and to display the message on the terminal, comprising:

a means for causing the terminal to display a message viewer which displays the message;

a means for causing the terminal to measure a period of time during which a given message is displayed in the message viewer;

a request means for causing the terminal to request from the information provider a message related to a user of the terminal;

a means for causing the terminal to store the message sent from the information provider based on the request from the request means, in a buffer; and a means for causing the terminal to display the message stored in the buffer on the message viewer when the timer has counted out the predetermined period.

7. A recording medium according to item 6 further comprising a means for causing the terminal to reset the timer when the message viewer is operated on.

8. A recording medium according to item 6 further comprising a means for causing the terminal to reset the timer when the user operates on the information in the message displayed by the viewer.

9. A recording medium according to item 6 further comprising a means for causing the terminal to keep the message stored in the buffer even when another message is displayed in the viewer based on the operation of the user.

10. A recording medium storing a program which causes a terminal to receive a message from an information provider connected to Internet and display the received message on a display comprising:

a means for causing the terminal to display an information request button which requests information related to the message;

a means for causing the terminal to request the name and address of the display apparatus user form the information provider when the information request button is selected;

a means for causing the terminal to display the name and address received from the information provider;

a means for causing the terminal to input data to confirm the name and address; and a means for causing the terminal to send an order to send the information to the addressee specified by the name and address, if the name and address are confirmed.

Recording medium which store programs for the function of the message viewer 76, recording medium which store programs for the function of the message manager 24 and recording medium which store programs for the function of the message distributor 28 can only be used to manufacture the terminal 10, the message manager 24 and the message distributor 28, respectively. Therefore, it is obvious that the manufacture and sale of such recording medium would constitute infringement of a patent of the present invention.

4.6 Appearance on Display 12

The browser window 60 and the message viewer window 62 may be arranged in the vertical direction on the display 12. The browser window 60 and the message viewer window 62 may be displayed as a single window unit, which is divided into two areas. In this case, the information received from Internet 32 and the information received from the message manager 24 are separately displayed in the respective areas in the single window unit. Alternatively, the image of the browser 74 and the image of the message display module 76 can be displayed in the same window or area at different times. For example, while the browser 74 is downloading a new home page, the message display module 76 can be displaying the message for a predetermined time period. The browser 74 then displays the downloaded home page after the predetermined time period is up. The message display module 76 can download the next message while the browser 74 is displaying the home page.

4.7 Network System Construction

Figure 26:
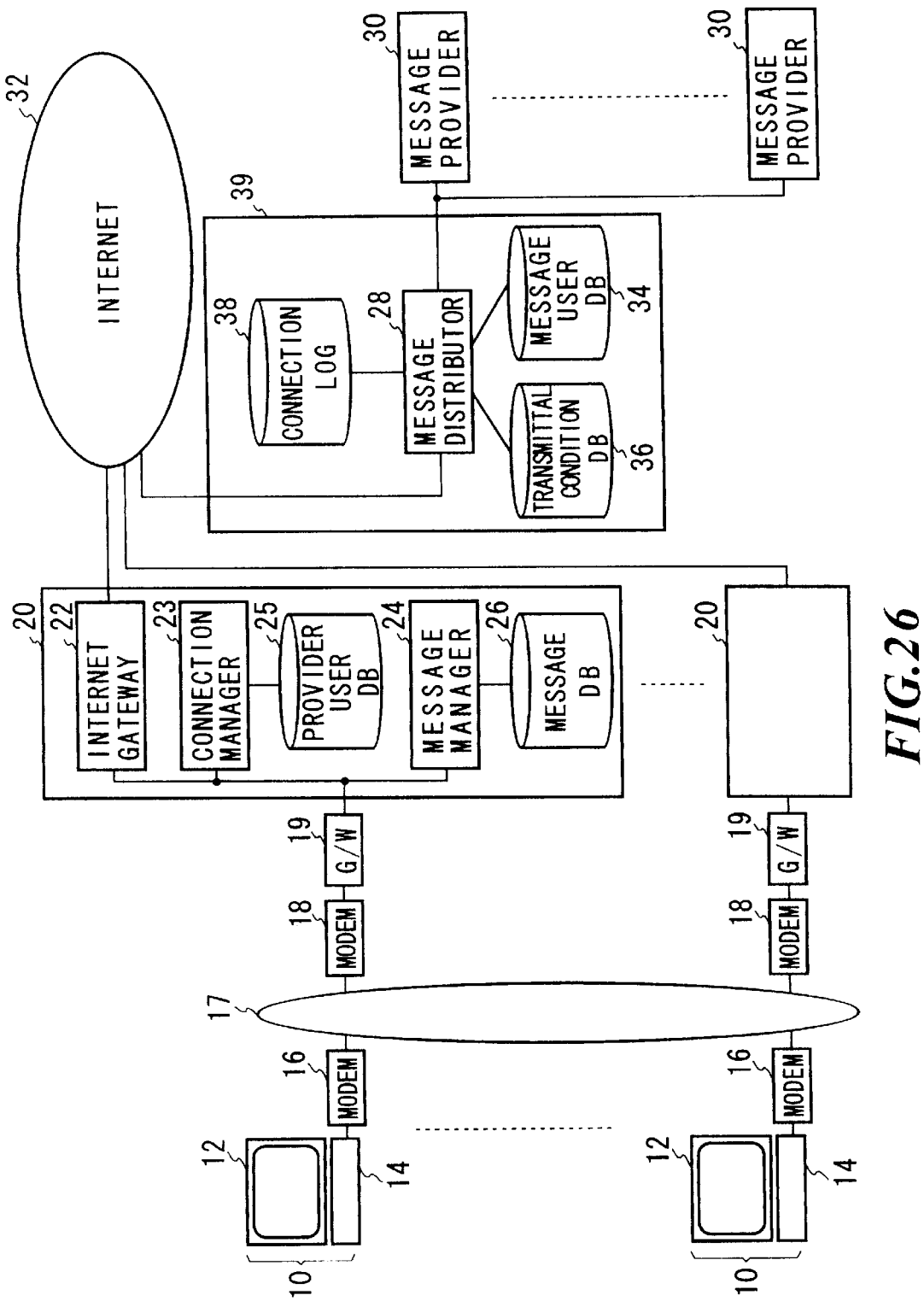
FIG. 26 is an alternate construction of the communications system.

FIGS. 26 to 30 show other examples of the network system. Various kinds of modifications can be made to the network system construction. For example, as FIG. 26 shows, the message distributor 28 can be connected to the information provider 20 through Internet 32 instead of by a dedicated line. In this case, the message viewer 76 communicates with the message distributor 28 via an Internet gateway 22 and Internet 32 instead of via the message manager 24. When the message provider 30 is connected to many information providers 20, the number of dedicated lines is reduced and the overall system can be simplified. Some information providers 20 can be connected to the message distribution system 39 via dedicated lines and other information providers 20 can be connected to the message distribution system 39 via Internet 32.

Figure 27:
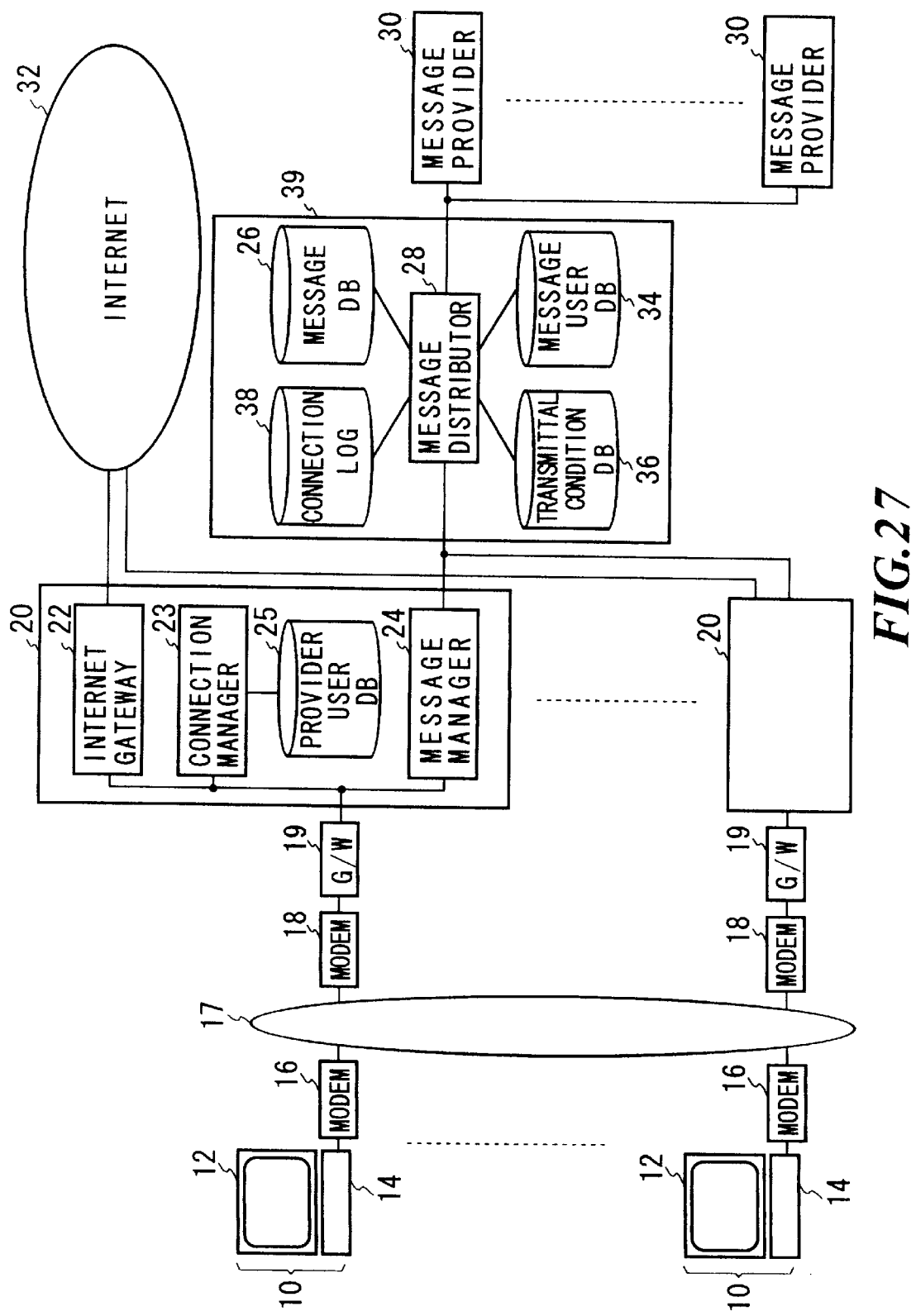
FIG. 27 is an alternate construction of the communications system.
Figure 28:
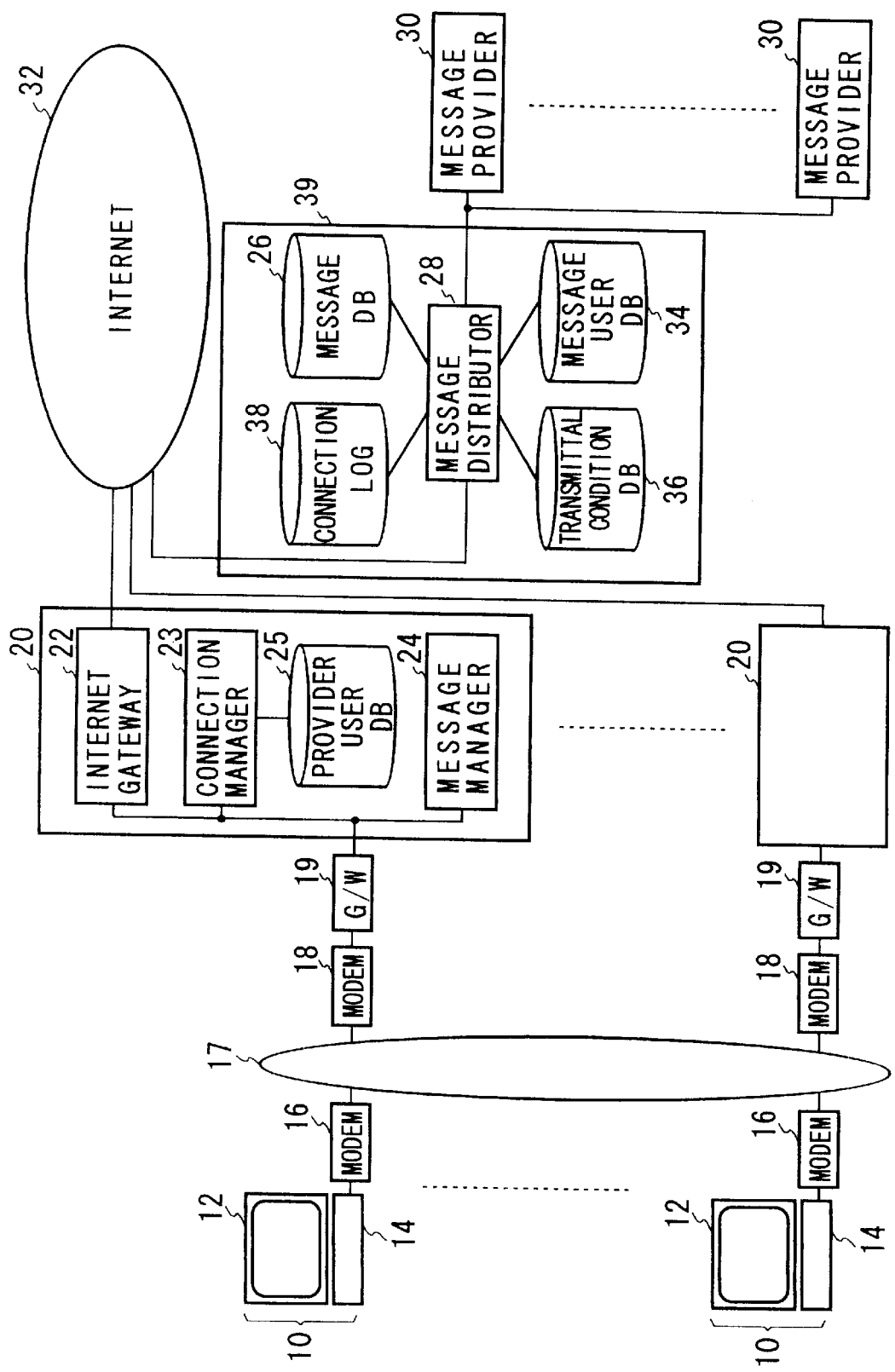
FIG. 28 is an alternate construction of the communications system.

As FIG. 27 shows, the message database 26 can be provided in the message distribution system 39 instead of in the information provider 20. In this case, the message viewer 76 receives the message (image) from the message distribution system 39 instead of from the information provider 20. The message database 26 may be provided in both the message distribution system 39 and some of the information providers 20. In this case, the users accessing an information provider 20 which has a message database 26 receive messages from the information provider 20. The users connected to an information provider 20 which does not have a message database 26 receive messages from the message distribution system 39. As FIG. 28 shows, the message distributor 39 and the information provider 20 can be connected via Internet 32 instead of by a dedicated line.

Figure 29:
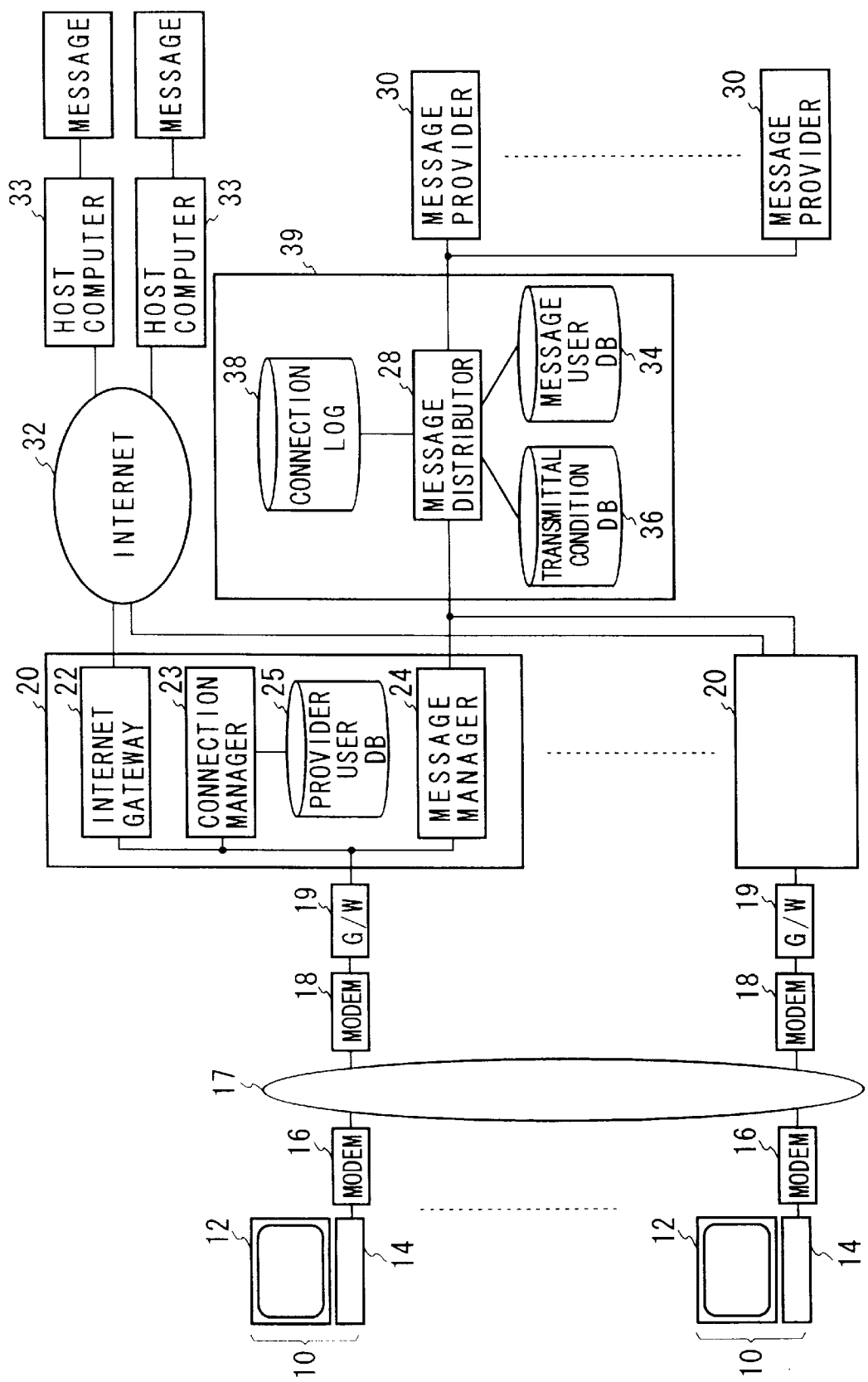
FIG. 29 is an alternate construction of the communications system.
Figure 30:
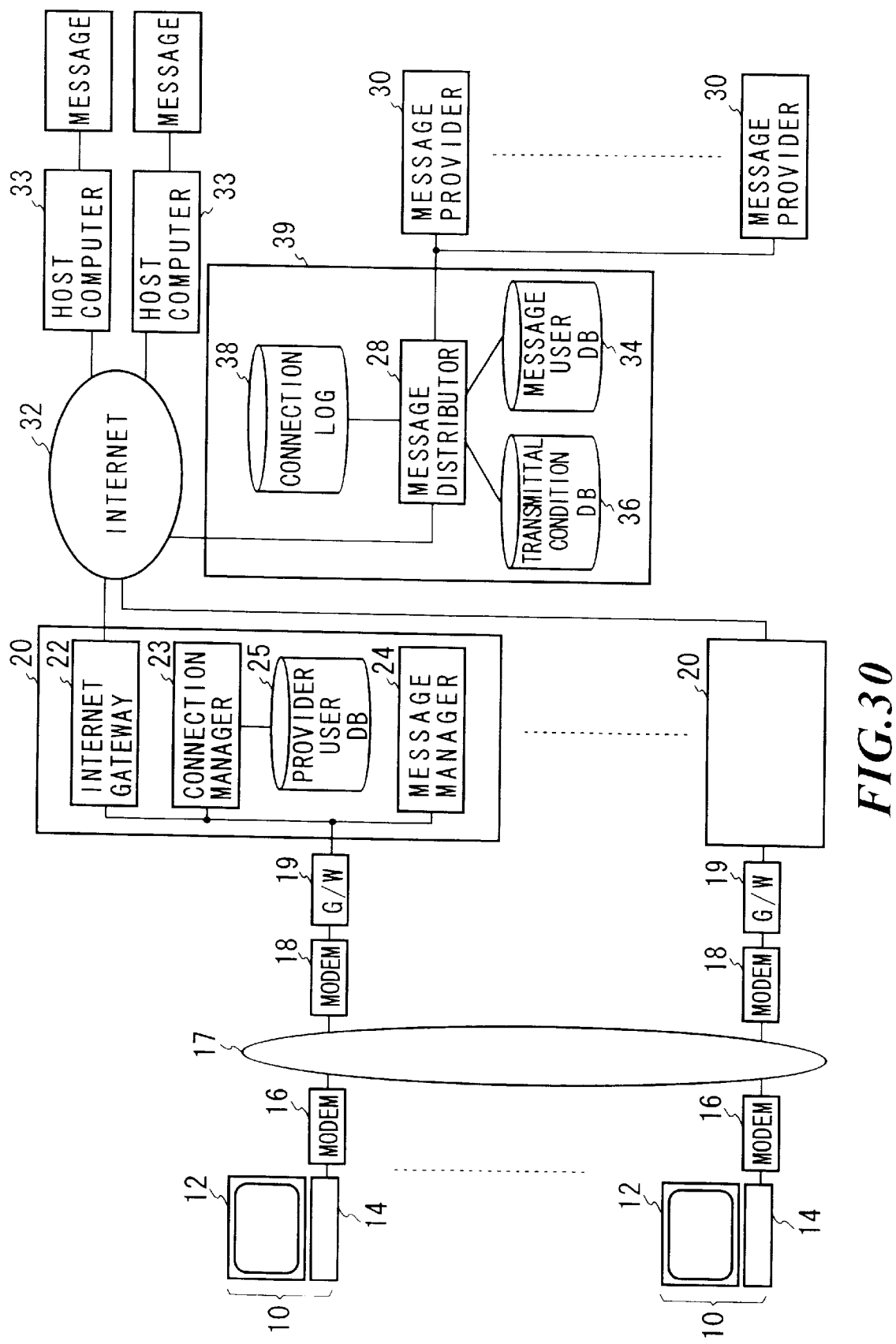
FIG. 30 is an alternate construction of the communications system.

As FIG. 29 shows, the messages can be distributed on the host computers connected to Internet 32. A message may be stored in a host computer 33 storing a home page corresponding to the message, or in a host computer 33 of the message provider 30. In this case, the message identification in the message transmittal condition database 36 identifies the distributed messages. According to this embodiment, the message providers 30 can change messages independently of the message distribution system 39 and the message provider 20. Thus, the burden on the information provider 20 is decreased. The message distribution system 39 may be connected to some or all of the information providers 20 via Internet 32 instead of via a dedicated line in this embodiment too.

5. Some Alternatives

Although the present invention has been described in conjunction with specific embodiments, the present invention is not limited to these embodiments. Many modifications and substitutions are apparent for those skilled in the art without departing from the spirit and the scope of the invention, which is defined by the appended claims.

For example, some operations of the information provider 20 and the message distributor 28 can be conducted by the terminal 10. More specifically, the message user database 34 needs not be provided within the message distribution system 39 and the terminal 10 can store the user information of its own user. In this case, the message distributor 28 does not search for the URL but transmits the URLs together with the transmission conditions of the URLs to the terminal 10. The terminal 10 searches for the appropriate URL and requests the corresponding message from the information provider 20. According to this embodiment, the burden on the message distributor 28 can be decreased. The message user database 34 of the message distributor 28 may store a part of the user information to search for message candidates and may transmit the retrieved messages together with the transmission conditions of the messages to the terminal 10. The terminal 10 then searches for a message to be displayed from the received messages using the other user information. According to this embodiment, the burden on the message distributor 28 and the data traffic between the information provider 20 and the terminal 10 can be decreased.

The information provider 20 may store the message transmission conditions in association with the message so as to be able to transmit the message and the message transmission conditions to the terminal 10 in response to a message request. Here, the terminal 10 searches for an appropriate message corresponding to the user information, from the received messages, and displays the appropriate message. In this embodiment, the burden on the message distributor 28 to search for messages is negligible.

The information provider 20 may conduct some of the operations of the above terminal 10 and the above message distributor 28. More specifically, the message distributor 28 and the information provider 20 may be realized by a single computer, which conducts all of the above operations of the message distributor 28. Also, the message distributor 28 may conduct some of the operations of the terminal 10 and the information provider 20. More specifically, the message manager 24 may be a mere gateway and all the above operations of the message manager 24 may conducted by the message distributor 28.

As seen above, additional information (messages) such as advertisements is displayed in a window, which is separate from the browser. This can prevent the additional information from disappearing from the display when the user scrolls information in the browser on the terminal. Furthermore, two logical links are established on the communication line from the terminal. One link is used to provide designated information to one window, while the other link is used to provide the additional information to the other window. This allows the additional information to be provided continuously while the user accesses various sites on Internet. The controllers of one link positioned on the communications network side and the terminal side, can obtain information about the other link. Therefore, one link can control the charging status of the other link.

What is claimed is:

1. A communications system comprising an information provider which provides a connection to the World Wide Web, and a terminal which accesses the World Wide Web through the information provider, wherein, the terminal has:
   a means for establishing a communication line to the information provider;
   a means for transmitting user information about a user of the terminal to the information provider;
   a means for activating a browser for displaying a browser window and a first image provided on the World Wide Web;
   a means for establishing a first TCP/IP link with a first link identification on the communication line;
   a means for receiving the first image from the information provider using the first TCP/IP link and displaying the first image within the browser window; and
   a means for establishing a second TCP/IP link on the communication line with a second link identification, the second link identification being different from the first link identification;

the information provider has:
   a message database storing second images; and
   a means for transmitting one of the second images selected from the message database based on the user information, to the terminal through the second TCP/IP link; and the terminal further has;
   a means for activating a viewer for displaying a viewer window and the second image; and
   a means for receiving the second image through the second TCP/IP link and displaying the second image within the viewer window.

2. A terminal connected to the World Wide Web through an information provider for receiving a first image provided on the World Wide Web and a second image provided on the information provider, comprising:
   a means for establishing a communication line to the information provider;
   a means for activating a browser for displaying the first image;
   a means for establishing a first TCP/IP link with a first link identification on the communication line;
   a means for receiving the first image through the first TCP/IP link and displaying the first image within a browser window opened by the browser;
   a means for activating a viewer for displaying the second image;
   a means for establishing a second TCP/IP link on the communication line with a second link identification, the second link identification being different from the first link identification;
   a means for receiving the second image through the TCP/IP link and displaying the second image within a viewer window opened by the viewer.

3. The terminal according to claim 2, wherein
   the second image has correspondence information for designating the first image; and
   the viewer has:
      a means for displaying a button within the viewer window;
      a means for reading the correspondence information from the second image when the button is selected;
      a means for supplying the correspondence information to the browser so as to display the first image designated by the correspondence information within the browser window.

4. A terminal according to claim 3, wherein
   the viewer has a means for supplying information which indicates that the first image designated by the linking information has been selected, to the information provider.

5. A terminal according to claim 4, wherein the communication line is established as a PPP connection.

6. An information provider connected to a communications network for transferring a first image provided in the communications network, to a terminal, comprising:
   a means for establishing a communication line to the terminal;
   a connection manager for establishing a first logical link having a first link identification on the communication line;
   a means for transferring the first image from the communications network to the terminal using the first logical link, based on a request sent from a user of the terminal for display of the first image in a browser window on the terminal;
   a message distribution system for storing identification information of second images and transmittal conditions for the second images, and for selecting a one of the second images for receipt by the terminal;
   a means for establishing a second logical link having a second link identification on the communication line;
   a message manager, operating outside of the user's control, for causing one of the second images to be transmitted to the terminal using the second logical link for display in a viewer window of the terminal, the second images selected by the message distribution system based on user information stored in association with the user.

7. An information provider according to claim 6, the message database having a plurality of second images, and the information provider further comprising:
   a user identification receiving means for receiving, from the terminal, a user identification which identifies the user;
   a connection means for connecting a second communication line to a searcher which stores the user information in association with the user identification, and stores transmittal conditions of the second images in association with image identifications of the second images;
   a user identification transferring means for transferring the user identification received by the user identification receiving means, to the searcher using the second communication line;
   a reading means for reading a second image from the message database based on an image identification searched for by the searcher based on the user information, which is read by the searcher using the user identification; and
   a message transmitting means for transmitting the second image read by the reading means to the terminal.

8. An information provider according to claim 7, wherein the connection manager has:
   a means for requesting the user identification from the terminal before establishing the first logical link;
   the user identification receiving means; and
   a means for transmitting the user identification to the message manager; and
   the message manager has:
      the connection means; and
      the user identification transferring means.

9. An information provider according to claim 8, wherein:
   the message manager further has a means for receiving an image request requesting a second image, from the terminal through the second logical link; and
   the message transmitting means transmits the second image to the terminal in response to the image request.

10. An information provider according to claim 9, wherein the message manager has a means for sending a notification indicating a display status of the terminal, to the connection manager.

11. An information provider according to claim 10, wherein the connection manager has a means to stop charging the terminal when the notification indicates that the second image is displayed on the terminal, and a means to start charging the terminal when the notification indicates that the second image is not displayed on the terminal.

12. An information provider according to claim 10, wherein the connection manager has a means to stop charging the terminal when the notification indicates that the whole second image is displayed on the terminal, and a means to start charging the terminal when the notification indicates that the whole of the second image is not displayed on the terminal.

13. An information provider according to claim 10, wherein the connection manager has a means to stop charging the terminal when the notification indicates that a viewer, which displays the second image on the terminal, is active, and a means to start charging the terminal when the notification indicates that the viewer is not active.

14. An information provider according to claim 10, wherein the connection manager has:
   a means to stop charging the terminal upon determining, based on the notification, that the whole second image was displayed on the terminal for a predetermined period of time; and
   a means to start charging the terminal upon determining, based on the notification, that the whole of the second image was not displayed on the terminal for the predetermined period of time.

15. An information provider according to claim 14, wherein the communications network is the World Wide Web.

16. A communications system comprising an information provider for providing a connection to the World Wide Web, and a terminal which accesses the World Wide Web through the information provider, wherein,
   the terminal has:
      means for establishing a communication line to a gateway of the information provider;
      means for transmitting user information about a user of the terminal to the information provider;
      means for activating a browser for displaying a browser window and a first image stored within the World Wide Web;
      means for establishing a first TCP/IP link with a first link identification on the communication line;
      means for receiving the first image from the information provider using the first TCP/IP link and displaying the first image within the browser window; and
      means for establishing a second TCP/IP link on the communication line with a second link identification, the second link identification being different from the first link identification;
   the information provider has:
      a message distribution system for storing identification information of second images and transmittal conditions for the second images, and for selecting a one of the second images for transmission to the terminal; and
      means for transmitting location information of second images to the terminal; and
   the terminal further has;
      means for activating a viewer for displaying a viewer window and the second image; and
      means for receiving the location information of the second images;
      means for receiving a one of the selected second images through the second TCP/IP link and displaying the one second image within the viewer window.

17. A terminal connected to the World Wide Web by an information provider, the terminal for receiving a first image provided on the World Wide Web and a second image selected by the information provider, comprising:
   means for establishing a communication line to a gateway of the information provider;
   means for transmitting user information about a user of the terminal to the information provider;
   means for activating a browser for displaying the first image;
   means for establishing a first logical link with a first link identification on the communication line;
   means for receiving the first image through the first logical link and displaying the first image within a browser window opened by the browser;

means for establishing a second logical link on the communication line with a second link identification, the second link identification being different from the first link identification;

means for receiving the second image selected by the information provider through the second logical link and displaying the second image within a viewer window opened by the viewer.

18. The terminal connected to the World Wide Web by an information provider of claim 17 wherein the first link identification comprises a first IP address and the second link identification comprises a second IP address.

19. The terminal connected to the World Wide Web by an information provider of claim 17 wherein the first link identification comprises a first port and the second link identification comprises a second port.

20. The terminal connected to the World Wide Web by an information provider of claim 17 wherein the viewer window is distinct from the browser window.

21. The terminal connected to the World Wide Web by an information provider of claim 17 wherein the viewer controls the viewer window to remain fully displayed so long as a condition is met.

22. A method of operating a terminal connected to the World Wide Web by an information provider, the method for displaying on the terminal a first image provided on the World Wide Web and a second image selected by the information provider, the method comprising the steps of:

activating a viewer;

establishing a communication line to a gateway of the information provider;

activating a browser for displaying the first image;

establishing a first logical link with a first link identification on the communication line;

receiving the first image through the first logical link and displaying the first image within a browser window opened by the browser;

establishing a second logical link on the communication line with a second link identification, the second link identification being different from the first link identification;

receiving the second image selected by the information provider through the second logical link; and displaying the second image within a viewer window opened by the viewer.

23. The method of claim 22 wherein the viewer controls the viewer window to remain fully displayed so long as a condition is met.

24. The method of claim 22 wherein the viewer window is distinct from the browser window.

25. A method of providing a connection to the World Wide Web to a user of a terminal by an information provider, the method comprising the steps of:

(a) providing the terminal with a viewer, the viewer comprising a program for operating the terminal to:
establish a communication line to a gateway of the information provider;
transmit user information about the user of the terminal to the information provider;
activate a browser for displaying a browser window and a first image stored within the World Wide Web;
establish a first logical link with a first link identification on the communication line;
receive the first image from the World Wide Web through the first logical link and displaying the first image within the browser window; and
establish a second logical link on the communication line with a second link identification, the second link identification being different from the first link identification;
request the second image;
receive the second image through the second logical link; and
display the second image within the viewer window;

(b) providing a message distribution system for:
storing identification information and location information of second images and transmittal conditions for the second images;
selecting a one of the second images for transmission to the terminal; and
transmitting location information of the selected second image to the terminal.

26. The method of claim 25 wherein the viewer controls the viewer window to remain fully displayed so long as a condition is met.

27. The method of claim 25 wherein the viewer window is distinct from the browser window.

28. A method of transferring a first image provided in a communications network to a terminal, the method comprising:

the terminal establishing a communication line to a gateway of an information provider;

establishing a first logical link with a first link identification on the communication line;

transferring the first image from the communications network to the terminal using the first logical link, based on a request sent from a user of the terminal for display of the first image in a browser window on the terminal;

the information provider storing identification information of second images and transmittal conditions for the second images, the information provider selecting a one of the second images for transmission to the terminal;

establishing a second logical link on the communication line with a second link identification, the second link identification being different from the first link identification;

the terminal receiving on the second logical link one of the second images;

the terminal displaying the received second image in a viewer window of the terminal.

* * * * *

UNITED STATES PATENT AND TRADEMARK OFFICE
CERTIFICATE OF CORRECTION

PATENT NO.     : 6,157,946
DATED          : December 5, 2000
INVENTOR(S)    : Yuichiro Itakura, Yuichiro Tsutsui, Nobuyuki Fujita Page 1 of 1

It is certified that error appears in the above-identified patent and that said Letters Patent is hereby corrected as shown below:

The Assignee should be interQ, Inc., Tokyo, Japan.

Column 27,
Line 5, for the claim reference numeral "7", insert at the beginning of the line -- message distribution system including a--.

Signed and Sealed this

Twenty-eighth Day of August, 2001

Attest:

NICHOLAS P. GODICI
Attesting Officer    Acting Director of the United States Patent and Trademark Office